US012786203B2

(12) United States Patent
Ishikawa

(10) Patent No.: US 12,786,203 B2
(45) Date of Patent: Nov. 3, 2026

(54) ABNORMALITY NOTIFICATION AND VERIFICATION SYSTEM, DEVICE, AND METHOD

(71) Applicant: CANON KABUSHIKI KAISHA, Tokyo (JP)

(72) Inventor: Manabu Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 18/740,624

(22) Filed: Jun. 12, 2024

(65) Prior Publication Data

US 2024/0430272 A1 Dec. 26, 2024

(30) Foreign Application Priority Data

Jun. 20, 2023 (JP) ................................ 2023-101186

(51) Int. Cl.
*H04L 9/40* (2022.01)

(52) U.S. Cl.
CPC ........ *H04L 63/123* (2013.01); *H04L 63/1416* (2013.01); *H04L 63/1441* (2013.01)

(58) Field of Classification Search
CPC ............... H04L 63/123; H04L 63/1416; H04L 63/1441; H04L 2209/84; H04L 9/3268; H04L 63/1425; H04W 4/46; H04W 4/48
See application file for complete search history.

(56) References Cited

U.S. PATENT DOCUMENTS 11,107,300 B2 * 8/2021 Unagami .......... B60W 50/0098
2007/0118638 A1 * 5/2007 Ban .................... G05B 23/0272 709/224

(Continued)

FOREIGN PATENT DOCUMENTS

CN 115550880 A 12/2022
JP 2009289220 A 12/2009

(Continued)

OTHER PUBLICATIONS

ETSI, "Intelligent Transport Systems (ITS); Security; Pre-standardization study on Misbehavior Detection; Release 2," ETSI Technical Report TR 103 460 v2.1.1, European Telecommunications Standards Institute, (Oct. 2020).

(Continued)

*Primary Examiner* — Lizbeth Torres-Diaz
(74) *Attorney, Agent, or Firm* — Venable LLP

(57) ABSTRACT

An information processing system comprising a first device and a second device that are communicably connected, wherein the first device includes: a detection unit configured to detect an abnormality, and a notification unit configured to notify the second device of an abnormality in a case where the detection unit detects the abnormality; and the second device includes: a reception unit configured to receive the notification of the abnormality by the notification unit, an acquisition unit configured to acquire information related to the abnormality from the first device and/or an other device of the information processing system in response to the reception unit receiving the notification of the abnormality, and a verification unit configured to verify validity of the notification of the abnormality based on the information acquired by the acquisition unit.

17 Claims, 16 Drawing Sheets

(56) References Cited

U.S. PATENT DOCUMENTS

| | | | | |
|---|---|---|---|---|
| 2014/0196134 | A1* | 7/2014 | Yamaguchi | G06F 21/44 726/7 |
| 2016/0140842 | A1* | 5/2016 | Park | G08G 1/0112 340/905 |
| 2018/0302422 | A1* | 10/2018 | Kishikawa | H04L 9/3271 |
| 2019/0349394 | A1* | 11/2019 | Kishikawa | H04L 63/1416 |
| 2022/0286473 | A1* | 9/2022 | Ujiie | G06F 11/07 |

FOREIGN PATENT DOCUMENTS

| | | | | |
|---|---|---|---|---|
| JP | 2020166452 | A | 10/2020 | |
| KR | 102254509 | B1 * | 5/2021 | H04L 9/3268 |

OTHER PUBLICATIONS

Extended European Search Report dated Oct. 2, 2024 in counterpart European Patent Appln. No. 24182105.

* cited by examiner

FIG. 3A
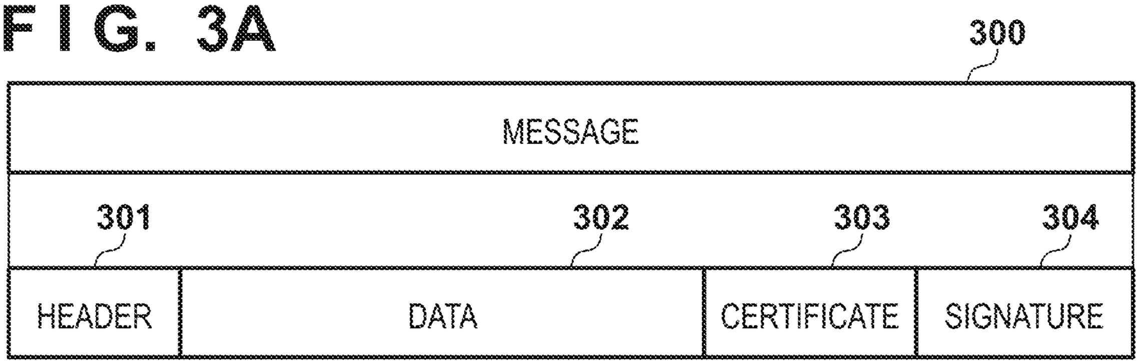
FIG. 3B
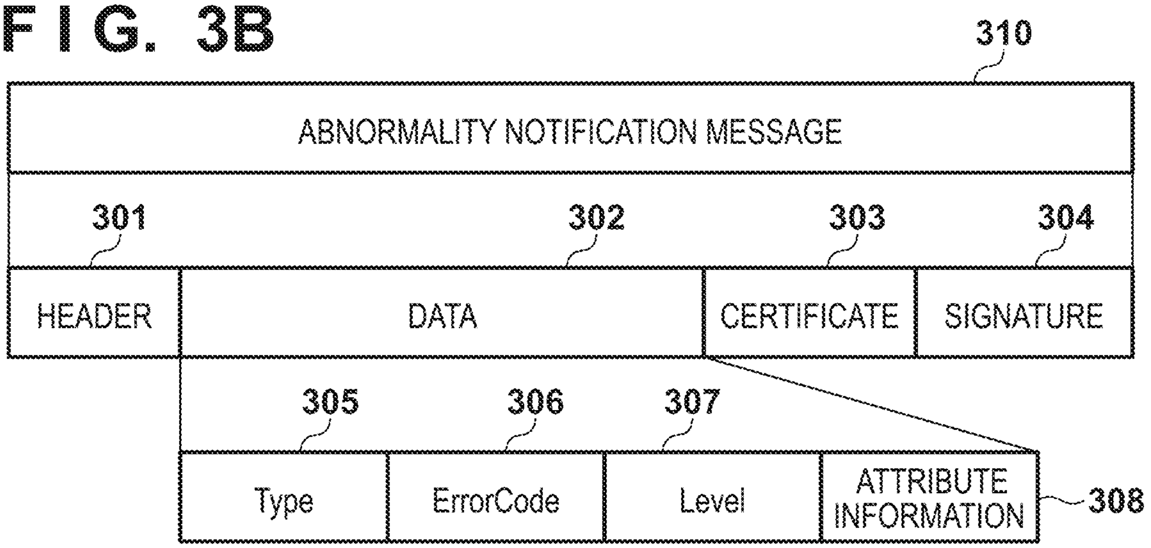
FIG. 3C
320
| ID | Type |
|---|---|
| 1 | Safety |
| 2 | Security |
| 3 | Semantic |
| 4 | ... |
FIG. 3D
321
| ID | ErrorCode |
|---|---|
| 1 | Hardware |
| 2 | Freeze |
| 3 | timestamp/ sequencenumber/ checksum |
| 4 | connected device |
| 5 | buffer overflow/ underflow |
| 6 | command |
| 7 | non-intended function |
| ... | ... |
FIG. 3E
322
| ID | Level |
|---|---|
| 1 | SERIOUS FAILURE |
| 2 | ... |
| 3 | MINOR FAILURE |
| 4 | ... |
| 5 | |

ABNORMALITY NOTIFICATION AND VERIFICATION SYSTEM, DEVICE, AND METHOD

BACKGROUND OF THE INVENTION

Field of the Invention

The present invention relates to an information processing system, an information processing device, an information processing method, and a storage medium.

Description of the Related Art

In recent years, there has been known a system in which a device having a communication function is connected to the Internet or a cloud and communicates with a server or another device to acquire various pieces of information, thereby receiving services. Examples of the device having such a communication function include a fixed device such as office equipment such as a copier and a printer, and a moving body such as a vehicle and a drone. In such a system, when the server that has received the abnormality notification determines that the abnormality has occurred in the device that is the transmission source of the abnormality notification, the server performs post-processing defined in the system on the device. Post-processing is performed to make the system robust, for example, isolating the device from the network. For example, in a certificate-based system, post-processing may be performed to revoke a certificate of a device in which an abnormality has occurred. In this way, in a case where the post-processing is executed, the other device can continue the service using the system, but the device that has transmitted the abnormality notification cannot continue the service. Since the device that has transmitted the abnormality notification suffers such a disadvantage, reliability of the abnormality notification message transmitted by the device is important. In addition, it is also important for the server that has received the abnormality notification to correctly determine whether or not information transmitted from the device in which the abnormality has occurred, the device that has been attacked, or the like is reliable.

Japanese Patent Laid-Open No. 2020-166452 discloses a system in which a server collects and analyzes vehicle data to detect a cyberattack on an in-vehicle network. According to Japanese Patent Laid-Open No. 2020-166452, a server determines whether or not a vehicle is subjected to a cyberattack based on collected vehicle data, and notifies a vehicle determined to be subjected to the cyberattack of a determination result. Japanese Patent Laid-Open No. 2009-289220 discloses a system that notifies a server of information in a case where a vehicle detects abnormal behavior of a person, and the server aggregates the information (e.g., for each area) and notifies other vehicles of danger such as theft.

In Japanese Patent Laid-Open No. 2020-166452, a server detects an abnormality and notifies the vehicle of the abnormality, and a confirmation target is limited, and furthermore, the reliability of data notified from the vehicle is not verified, and there is a possibility that accuracy of abnormality determination may lower. In addition, Japanese Patent Laid-Open No. 2020-166452 does not assume a configuration in which the device itself notifies an abnormality that occurred in the device, and the validity of the notified abnormality is not verified. In Japanese Patent Laid-Open No. 2009-289220, a server aggregates abnormality notifications transmitted by a device and provides a service according to an aggregation result, and validity is not verified for each notification. In the ETSI TR 103 460, there is no mechanism for notifying the abnormality that occurred in the own vehicle. As described above, there is no proposal for a mechanism for verifying the validity of the abnormality notification itself.

SUMMARY OF THE INVENTION

The present disclosure provides a technique for verifying validity of an abnormality notification notified to a server or the like.

According to one aspect of the present invention, there is provided an information processing system comprising a first device and a second device that are communicably connected, wherein the first device includes: a detection unit configured to detect an abnormality, and a notification unit configured to notify the second device of an abnormality in a case where the detection unit detects the abnormality; and the second device includes: a reception unit configured to receive the notification of the abnormality by the notification unit, an acquisition unit configured to acquire information related to the abnormality from the first device and/or an other device of the information processing system in response to the reception unit receiving the notification of the abnormality, and a verification unit configured to verify validity of the notification of the abnormality based on the information acquired by the acquisition unit.

Further features of the present invention will become apparent from the following description of exemplary embodiments (with reference to the attached drawings).

BRIEF DESCRIPTION OF THE DRAWINGS

FIG. 3A is a diagram illustrating an example of a format of a message.

FIG. 3B is a diagram illustrating a configuration example of an abnormality notification message.

FIG. 3C is a diagram illustrating an example of IDs corresponding to types of various abnormalities.

FIG. 3D is a diagram illustrating an example of IDs corresponding to codes indicating contents of various abnormalities.

FIG. 3E is a diagram illustrating an example of IDs corresponding to levels of various abnormalities.

DESCRIPTION OF THE EMBODIMENTS

Figure 1:
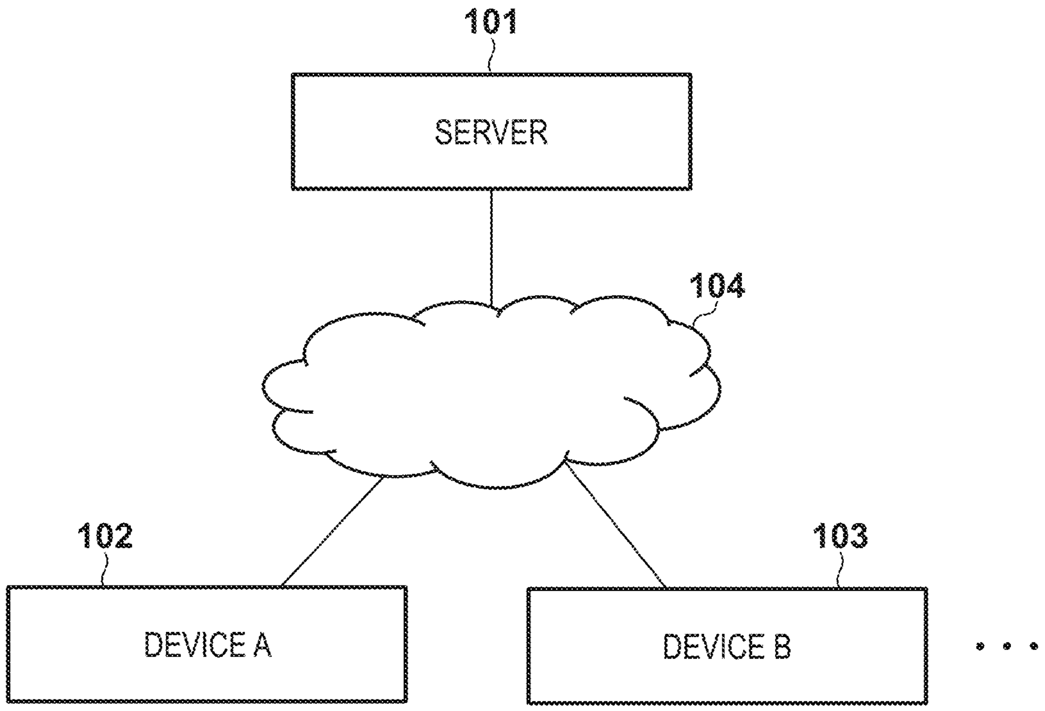
FIG. 1 is a block diagram illustrating a configuration example of a system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration example of an information processing system (hereinafter, referred to as a system) according to a first embodiment. As illustrated in FIG. 1, the system according to the present embodiment includes a server 101 that is an information processing device functioning as a certification authority, and a device A102 and a device B103 accessible to the server 101. The server 101, the device A102, and the device B103 are all connected to the network 104 and can communicate with each other. The network 104 is a wired and/or wireless network such as a LAN or the Internet. The device A102 and the device B103 are examples of information processing devices that can access the server 101 via the network 104. Note that, although FIG. 1 illustrates two information processing devices (the device A102 and the device B103) as devices that can access the server 101 via the network 104, the number of devices that can access the server 101 via the network 104 is not limited thereto. In addition, FIG. 1 illustrates a network configuration in which the device A102 and the device B103 directly perform data communication via the network 104, but the communication between the devices is not limited thereto. For example, data communication between devices may be performed via one or more relay devices provided between the devices.

Specific examples of the device A102 and the device B103 include a fixed device such as an office device that is connected to the Internet or a cloud and is connected to another device or server to provide a service. For example, the copier is connected to the Internet or a cloud to provide a printing service. When data exchange between devices and between a device and a server is frequently performed, information such as occurrence of abnormality transmitted by the device increases importance, and it is also important to ensure the reliability of the information.

Another specific example of the device A102 and the device B103 is a moving body. A vehicle, which is a representative example of a moving body, has a communication function, and transmits and receives information using V2X communication such as vehicle-to-vehicle communication (V2V) for communicating with another vehicle and road-to-vehicle communication (V2I) for communicating with a roadside device such as a traffic light. V2V represents a vehicle to vehicle, and V2I represents a vehicle to infrastructure. Activities for realizing support of driver's cognition, judgment, and operation have been promoted by connecting a vehicle to the Internet or a cloud and acquiring various information such as road information. In addition, with the spread of automatic driving and the like, traveling can be controlled based on information by a sensor of the own vehicle such as a traveling position and a moving speed measured by a sensor mounted on the vehicle and information received from the outside by the V2X communication. Here, in a case where an abnormality occurs in the own vehicle, it is important to transmit an abnormality notification and perform vehicle control based on the abnormality notification in the received vehicle or the like in order to prevent a traffic accident. Therefore, reliability of abnormality notification is also important.

Furthermore, in recent years, movement of utilizing a drone, which is a small unmanned moving body, has been activated, and such a moving body can also be applied as the device A102 and the device B103. For example, in a case where a drone is used for cargo delivery in the future, it is assumed that the drone flies in the sky about 150 m above the ground in an autonomous driving mode. On the other hand, in a case where an abnormality occurs in the drone, a situation where autonomous flying becomes impossible or a situation where the drone collides with another drone is assumed. Under such a situation, there is a possibility that the drone or the cargo falls to the ground, thereby causing damage to pedestrians on the ground. Therefore, it is important to notify other drones, and vehicles, pedestrians, and the like on the ground of the abnormality that has occurred in the drone. As described above, in a moving body such as a vehicle or a drone, securing the validity of the abnormality to be notified is one of the important problems.

Figure 2:
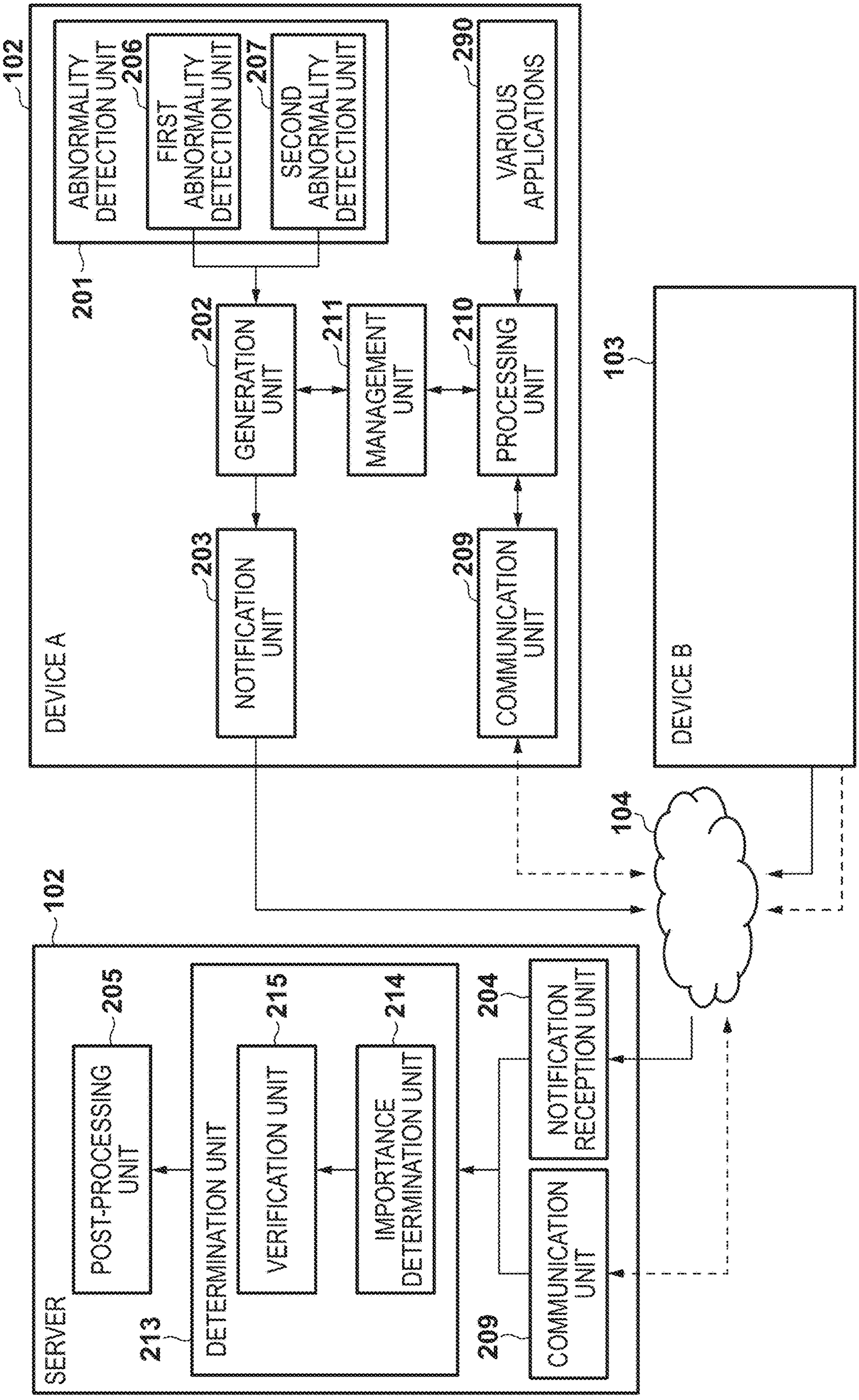
FIG. 2 is a block diagram illustrating a functional configuration example of a system according to the first embodiment.

FIG. 2 is a block diagram illustrating a functional configuration example of the server 101, the device A102, and the device B103. In FIG. 2, the functional configuration of the device B103 is similar to that of the device A102, and thus illustration thereof is omitted. In each of the following embodiments, the device A102 and the device B103 will be described as having the same functional configuration, but may be devices having different functional configurations. Hereinafter, the operation of each functional unit of such an information processing system will be described with reference to the flowchart of FIG. 4.

In the device A102, an abnormality detection unit 201 regularly or irregularly monitors presence or absence of occurrence of abnormality in the device A102. The abnormality detection unit 201 includes a first abnormality detection unit 206 and a second abnormality detection unit 207. The first abnormality detection unit 206 detects that "abnormality in terms of security" has occurred in the device A102. For example, the first abnormality detection unit 206 determines that an abnormality has occurred in a case where an attack on the device A102 from the outside is detected or in a case where it is detected that there is a suspicion of falsification or the like in a message received from the outside. For example, the first abnormality detection unit 206 detects an abnormality (in terms of security) in a message received from the outside or data saved in the device A102. For example, the first abnormality detection unit 206 detects, as an abnormality (in terms of security), falsification of a message detected by a MAC that is an authentication code, or malware intrusion detected by an anti-malware function using machine learning. Here, MAC is an abbreviation for Message Authentication Code. The second abnormality detection unit 207 monitors the operation of each function of the device A102 and detects "abnormality in terms of safety". For example, the second abnormality detection unit 207 includes a mechanism that makes the power supply circuit of the device A102 redundant and compares the output voltages, and detects unexpected power loss as an abnormality (in terms of safety).

In step S401, in a case where at least one of the first abnormality detection unit 206 and the second abnormality detection unit 207 detects an abnormality (YES in step S401), the process proceeds to step S402. On the other hand, in a case where neither the first abnormality detection unit 206 nor the second abnormality detection unit 207 detects an abnormality (NO in step S401), the process waits in step S401. In step S402, the generation unit 202 of the device A102 generates an abnormality notification message as a notification indicating the fact that an abnormality has occurred.

Although the device A102 (generation unit 202) can generate various types of messages, in the present embodiment, it is assumed that any message has the format illustrated in FIG. 3A. In FIG. 3A, an area 301 is an area for storing a header, and an area 302 is an area for storing data indicating contents to be notified. In addition, an area 303 is an area for storing a set of a certificate and a corresponding serial number, and an area 304 is an area for storing signature data of the certificate. The generation unit 202 of the device A102 generates an abnormality notification message according to the format illustrated in FIG. 3A.

FIG. 3B illustrates an example of a format of the abnormality notification message 310 generated by the generation unit 202. A header is stored in the area 301 of the abnormality notification message 310. The header includes information for identifying a transmission source (the device A102 in the present embodiment) of the abnormality notification message 310, information for identifying a transmission destination (the server 101 in the present embodiment) necessary in a protocol for connecting to and communicating via the network 104, and the like. An area 302 of the abnormality notification message 310 includes an area 305 for storing information indicating a type, an area 306 for storing an error code indicating an abnormality content, an area 307 for storing a level indicating the seriousness of the abnormality, and an area 308 for storing attribute information.

The area 305 stores an identifier (ID) corresponding to the type (Type) of the abnormality detected by the abnormality detection unit 201. FIG. 3C illustrates an example of a table in which an ID corresponding to the type of abnormality is registered. For example, in a case where the second abnormality detection unit 207 detects an abnormality, the generation unit 202 stores ID=1 corresponding to the type "Safety" of the table 320 in the area 305. In a case where the first abnormality detection unit 206 detects an abnormality, the generation unit 202 stores ID=2 corresponding to the type "Security" of the table 320 in the area 305. Table 320 in FIG. 3C is stored in a memory device accessible by the device A102. In a case where the number of types of abnormality to be detected increases, the type of abnormality and the corresponding ID may be additionally registered in the table 320.

The area 306 stores an ID corresponding to a code (ErrorCode) representing the content of the abnormality detected by the abnormality detection unit 201 (classification related to the cause of the abnormality). The contents of the abnormality include, for example, a hardware failure, an abnormality detected by the second abnormality detection unit 207 such as hardware not responding, an abnormality detected by the first abnormality detection unit 206 such as a message being falsified or attacked, and the like. FIG. 3D illustrates an example of a table in which IDs corresponding to codes representing the contents of various abnormalities are registered. Table 321 in FIG. 3D is stored in a memory device accessible by the device A102. In a case where the number of types of abnormality to be detected increases, a code representing the content of the abnormality and the corresponding ID may be additionally registered in the table 321.

The area 307 stores an ID corresponding to a level indicating how serious the abnormality detected by the abnormality detection unit 201 is. For example, in a case where the abnormality detection unit 201 detects a serious abnormality that causes an abnormality in driving, the generation unit 202 stores ID=1 corresponding to the level "serious failure" in the area 307. For example, in a case where the abnormality detection unit 201 detects an abnormality that does not affect driving, the generation unit 202 stores ID=3 corresponding to the level "minor failure" in the area 307. FIG. 3E illustrates an example of a table in which IDs corresponding to various abnormality levels are registered. Table 322 in FIG. 3E is stored in a memory device accessible by the device A102. In a case where the number of types of abnormality to be detected increases, the type of abnormality and the corresponding ID may be additionally registered in the table 322.

Furthermore, in the area 308, more detailed information (attribute information) regarding the abnormality that cannot be expressed only by the information stored in the areas 305 to 307 is stored. In the area 303 of the abnormality notification message 310, "the certificate and the serial number of the device A102" acquired by the device A102 from the certificate authority (the server 101 in the present embodiment) and managed by the management unit 211 is stored. The certificate is information indicating validity that the transmission source is authorized. In addition, signature data for proving that the abnormality notification message 310 is not falsified is stored in the area 304 of the abnormality notification message 310. For example, the generation unit 202 of the device A102 generates signature data signed using the "certificate of the device A102" managed by the management unit 211 for the hash value calculated for the entire abnormality notification message 310, and stores the signature data in the area 304.

Referring back to FIG. 4, in step S403, the notification unit 203 of the device A102 transmits (notifies) the abnormality notification message generated by the generation unit 202 in step S402 described above to the server 101 via the network 104. Note that the abnormality notification message may be transmitted to the server 101, or may be transmitted to a plurality of servers including the server 101 by using a mechanism such as multicast or broadcast, and a transmission method is not limited.

Next, an operation of the server 101 that receives the abnormality notification message from the device A102 will be described. In step S441, the notification reception unit 204 of the server 101 receives the abnormality notification message transmitted from the device A102. In step S442, the determination unit 213 determines whether or not the abnormality notification message received by the notification reception unit 204 needs to be verified by the verification function.

The determination unit 213 determines whether or not post-processing defined in advance in the system is necessary for the notified abnormality. The determination unit 213 of the present embodiment includes an importance determination unit 214 and a verification unit 215. The importance determination unit 214 determines the degree of influence on peripheral devices from the type and level of the abnormality and determines the seriousness of the abnormality. The verification unit 215 additionally verifies whether or not an abnormality has actually occurred from the continuity of the occurrence of the abnormality, the occurrence frequency, and the like. First, in step S442, the importance determination unit 214 analyzes the abnormality notification message received in step S441, and determines whether or not "immediate execution of post-processing" is necessary and whether or not "verification" by the verification unit 215 is necessary based on the management criterion of the server 101. Here, an example of determination by the importance determination unit 214 will be described. For example, in the system, it is assumed that the safety abnormality that brings on a traffic accident is important, but the security abnormality does not immediately bring on a traffic accident. In a case where ID=1 (Type=Safety) is stored in the area 305 of the abnormality notification message and ID=1 (Level=serious failure) is stored in the area 307, the importance determination unit 214 determines that "immediate execution of post-processing" is necessary. In addition, in a case where ID=2 (Type=Security) is stored in the area 305 of the abnormality notification message, the importance determination unit 214 determines that "verification" of the abnormality notification message is necessary. In addition, in a case where ID=3 (Type=Semantics) is stored in the area 305 of the abnormality notification message, the importance determination unit 214 determines that neither "post-processing" nor "verification" is necessary.

As a result of the determination in step S442 as described above, in a case where determination is made that "immediate execution of post-processing" is necessary, the process proceeds to step S445. On the other hand, in a case where determination is made in step S442 that "verification" is necessary, the process proceeds to step S406. Furthermore, in a case where determination is made in step S442 that neither "post-processing" nor "verification" is necessary, this process ends.

In step S443, the verification unit 215 performs verification using a verification process defined in advance in the system. For example, the verification unit 215 performs verification of the abnormality using the abnormality notification further received from the device A102 using the notification reception unit 204. Alternatively, the verification unit 215 communicates with the device A102 using the communication unit 209 or communicates with another device other than the device A102 to acquire additional information, and verifies the abnormality using the acquired information. In this manner, the additional information for verifying the validity of the notified abnormality can be acquired from the device that has notified the abnormality and/or from another device other than the device that has notified the abnormality. As a result of the above verification, in a case where the verification unit 215 determines that the device A102 that is the transmission source of the abnormality notification message received in step S441 is in an abnormal state (YES in step S444), the process proceeds to step S445. On the other hand, in a case where the verification unit 215 determines that the device A102 that is the transmission source of the abnormality notification message received in step S441 is not in an abnormal state (NO in step S444), this process ends.

In step S445, the post-processing unit 205 performs post-processing defined in advance in the system. For example, in a case where the system is constructed from a network between the devices, the post-processing unit 205 isolates the device of the transmission source of the abnormality notification message from the network. In this case, the system can be continuously operated only by a normal device by being isolated from the network.

As described above, according to the first embodiment, since the server verifies the abnormality notification from the device, the determination accuracy of the abnormal state in the device can be improved.

Second Embodiment

In each of the second and subsequent embodiments, differences from the first embodiment will be mainly described. Therefore, the present embodiment is similar to the first embodiment unless otherwise specified in the following description.

Figure 5:
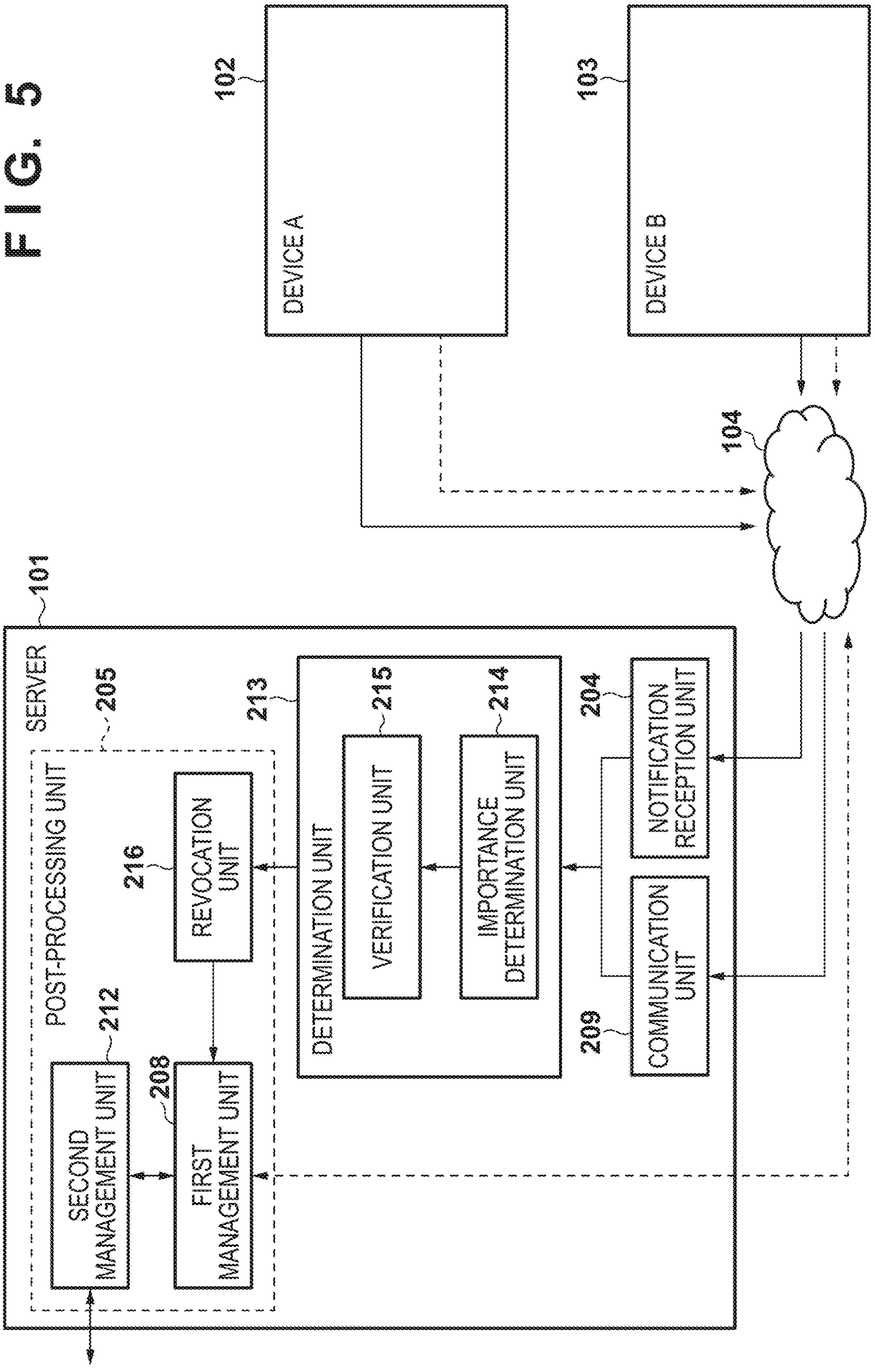
FIG. 5 is a block diagram illustrating a functional configuration example of a system according to a second embodiment.

FIG. 5 is a block diagram illustrating a functional configuration example of an information processing system according to a second embodiment. The system of the second embodiment is a certificate-based system. In FIG. 5, the functional configurations of the device A102 and the device B103 are similar to those of the first embodiment (FIG. 2), and the illustrations thereof are limited. In the second embodiment, a system in which a certificate is revoked as post-processing performed by the post-processing unit 205 of the server 101 will be exemplified. As illustrated in FIG. 5, the post-processing unit 205 of the server 101 includes a revocation unit 216, a first management unit 208, and a second management unit 212.

Figure 4:
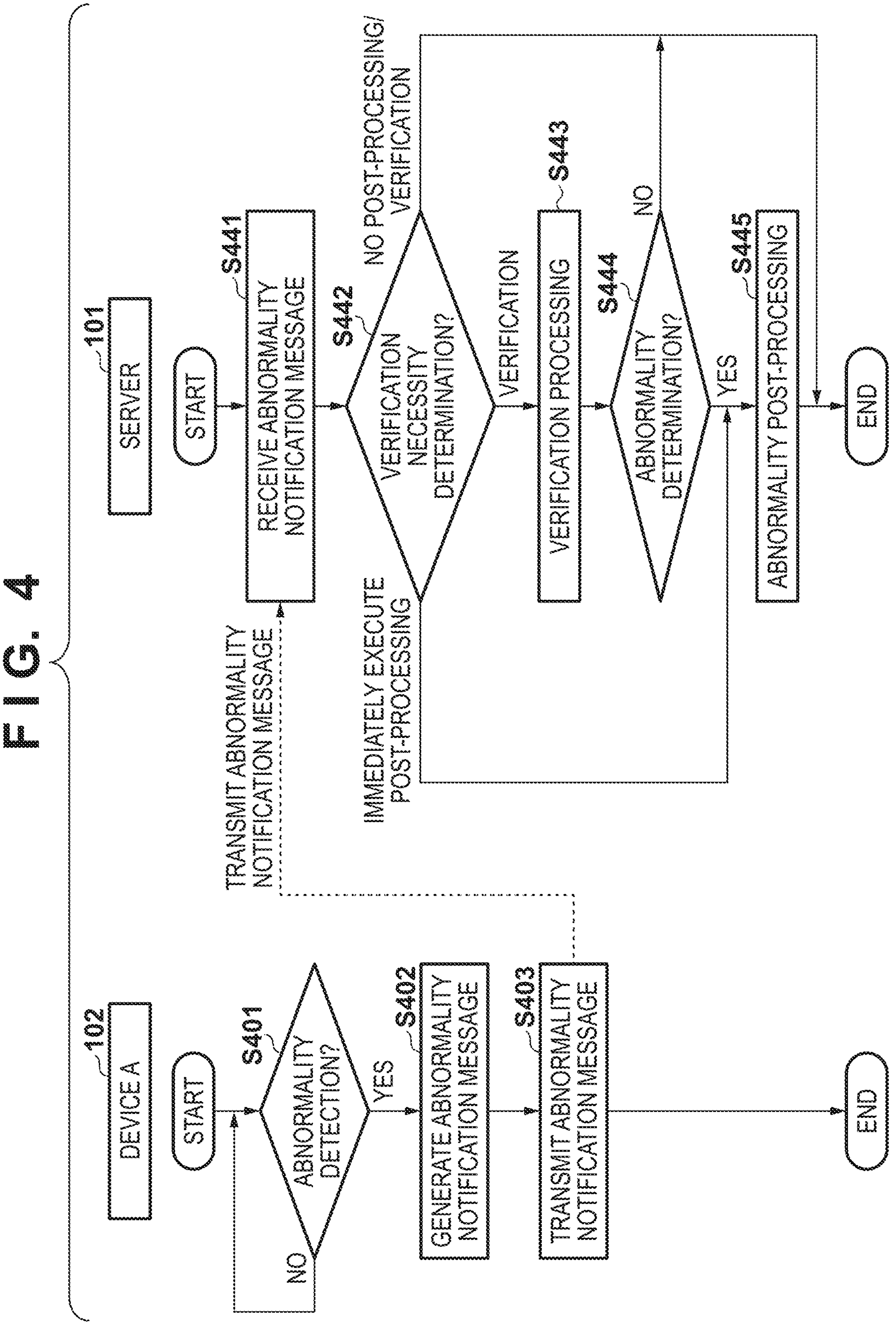
FIG. 4 is a flowchart illustrating an operation example of the system according to the first embodiment.

An operation of the system according to the second embodiment will be described with reference to a flowchart of FIGS. 6A and 6B. In the flowchart shown in FIGS. 6A and 6B, step S601, steps S641 to S642, and steps S661 to S667 are added to the process shown in the first embodiment (FIG. 4). Furthermore, FIGS. 7A, 7B and 7C is a flowchart illustrating an asynchronous example as a processing example different from that of FIGS. 6A and 6B.

The processes of steps S441 to S444 by the server 101 are the same as those in the first embodiment (FIG. 4). When determined in step S442 or step S444 that post-processing is necessary for the abnormality notification message received by the notification reception unit 204, the process proceeds to step S641, and post-processing is started. The process of step S641 is a process corresponding to the post-processing (step S445) at the time of abnormality in the first embodiment. In step S641, the revocation unit 216 revokes the certificate of the device A102 using the abnormality notification message received by the notification reception unit 204. The first management unit 208 manages a Certificate Revocation List (CRL) in which the serial number of a revoked certificate and the date and time of revocation (revocation date) are registered. The CRL is an example of management information including a certificate revocation state. The revocation unit 216 revokes the certificate of the device A102 by registering the serial number of the certificate included in the abnormality notification message received by the notification reception unit 204 and the current date and time in the CRL managed by the first management unit 208 and updating the CRL. In addition, the first management unit 208 manages the revoked certificate and responds to an inquiry about the revocation (step S642).

The second management unit 212 in the server 101 issues a certificate and a serial number, manages an issued certificate and serial number, verifies a certificate, and the like. For example, in a case where receiving a request to issue a certificate from an external device such as the device A102 or the device B103, the second management unit 212 issues a certificate of the external device and transmits the issued certificate and a serial number of the certificate to the external device. As a result, the external device can hold the certificate and the serial number of the own device. In the present embodiment, the server 101 includes the second management unit 212, but the present invention is not limited thereto, and an external device accessible by the server 101 may include the second management unit 212.

Here, it is assumed that, after revocation of the certificate of the device A102, the user performs an operation of transmitting a message to the device B103 using the various applications 290 of the device A102. When this operation is received in the device A102, the processing unit 210 generates a message having the format illustrated in FIG. 3A. Specifically, the processing unit 210 stores the header of the message in the area 301 and stores the content of the message in the area 302. In addition, the processing unit 210 stores the "certificate and serial number of the device A102" managed by the management unit 211 in the area 303. Furthermore, the processing unit 210 generates signature data of the message as described above, and stores the generated signature data in the area 304. In step S601, the communication unit 209 of the device A102 transmits the message generated by the processing unit 210 to the device B103 via the network 104.

In step S661, the communication unit 209 of the device B103 receives the message. In step S662, the communication unit 209 of the device B103 makes an inquiry about the CRL to the server 101. In step S642, the first management unit 208 of the server 101 transmits (notifies) the latest managed CRL to the device B103 in response to the inquiry. In step S663, the communication unit 209 of the device B103 receives the latest CRL transmitted from the server 101 (the first management unit 208), and the processing unit 210 of the device B103 updates the CRL managed by the management unit 211 to the received latest CRL.

In step S664, the processing unit 210 of the device B103 verifies whether or not the serial number of the certificate of the device A102 stored in the area 303 of the message received in step S607 is registered in the latest CRL managed by the management unit 211. Through this verification, the processing unit 210 of the device B103 determines whether or not the certificate of the device A102 is revoked. That is, in a case where the serial number of the certificate of the device A102 is registered in the latest CRL managed by the management unit 211, determination is made that the certificate of the device A102 is revoked. On the other hand, in a case where the serial number of the certificate of the device A102 is not registered in the latest CRL managed by the management unit 211, determination is made that the certificate of the device A102 is not revoked.

Here, it is assumed that the serial number of the certificate of the device A102 is registered in the latest CRL managed by the management unit 211. In this case, the processing unit 210 of the device B103 determines that the certificate of the device A102 is revoked (YES in S665). Therefore, the process proceeds to step S666, and the processing unit 210 of the device B103 discards the message received in step S661. Note that the discard of the message in step S666 is not essential as long as the process corresponding to the message received in step S661 is not performed. On the other hand, in a case where it is determined that the serial number of the certificate of the device A102 is not registered in the latest CRL managed by the management unit 211 and the certificate of the device A102 is not revoked (NO in step S665), the process proceeds to step S667. In step S667, the processing unit 210 of the device B103 executes processes according to the message received in step S661.

Figure 6A:
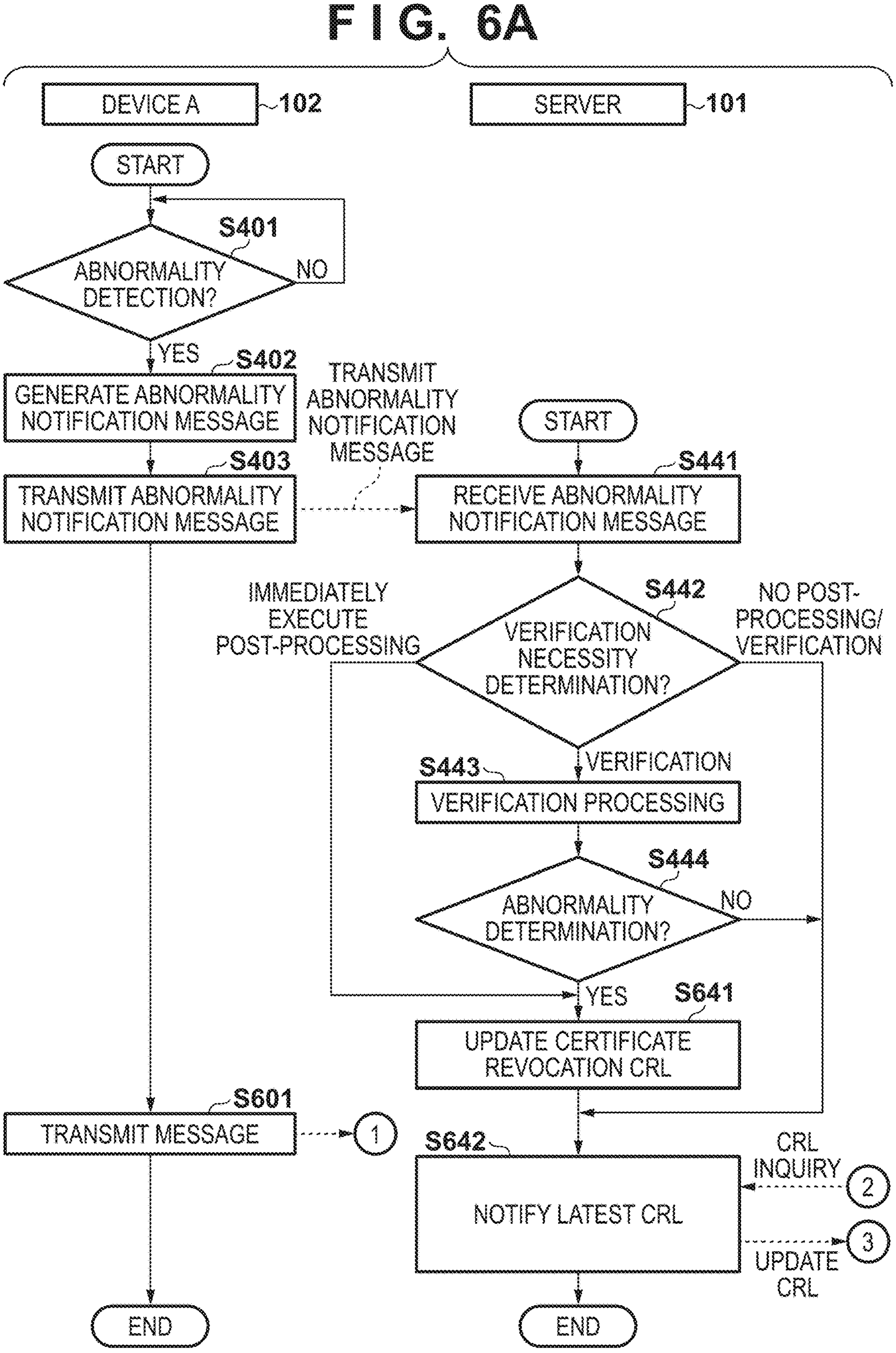
FIGS. 6A and 6B are a flowchart illustrating an operation example of the system according to the second embodiment.
Figure 6B:
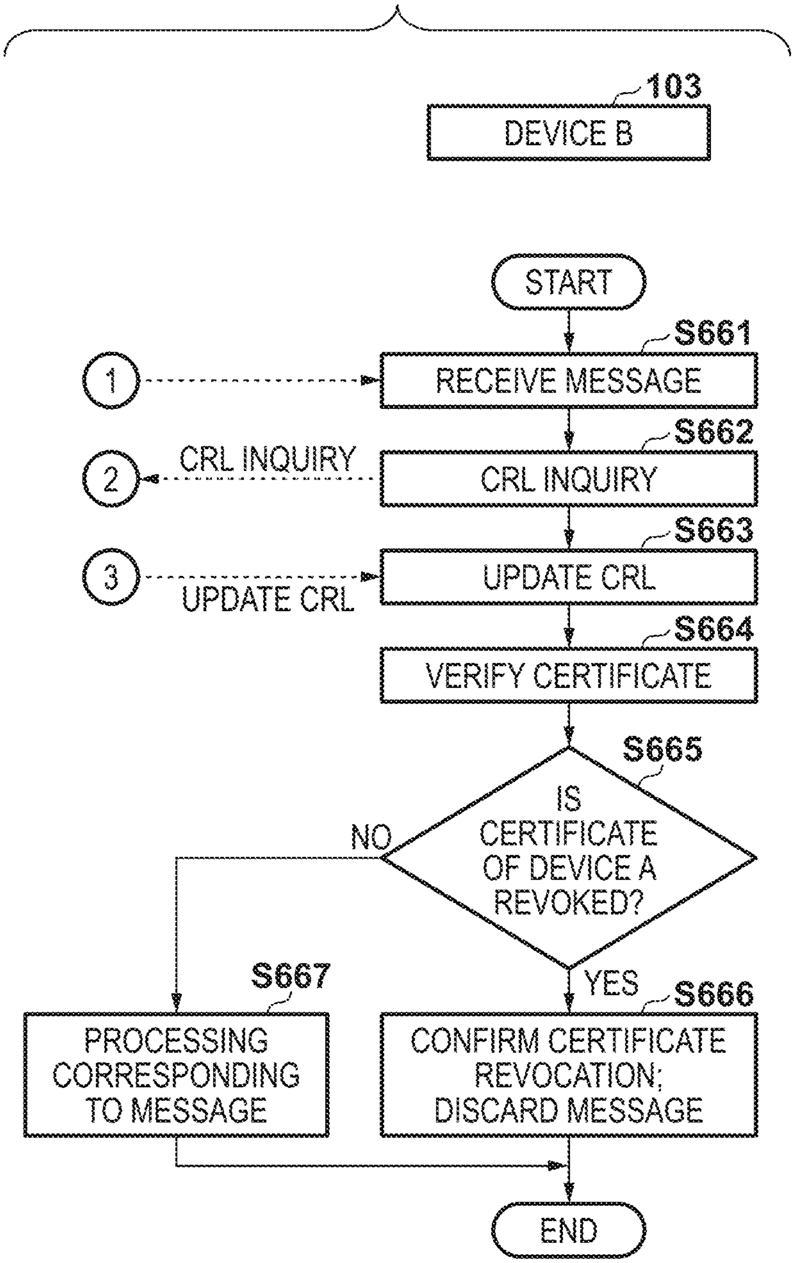
Figure 7A:
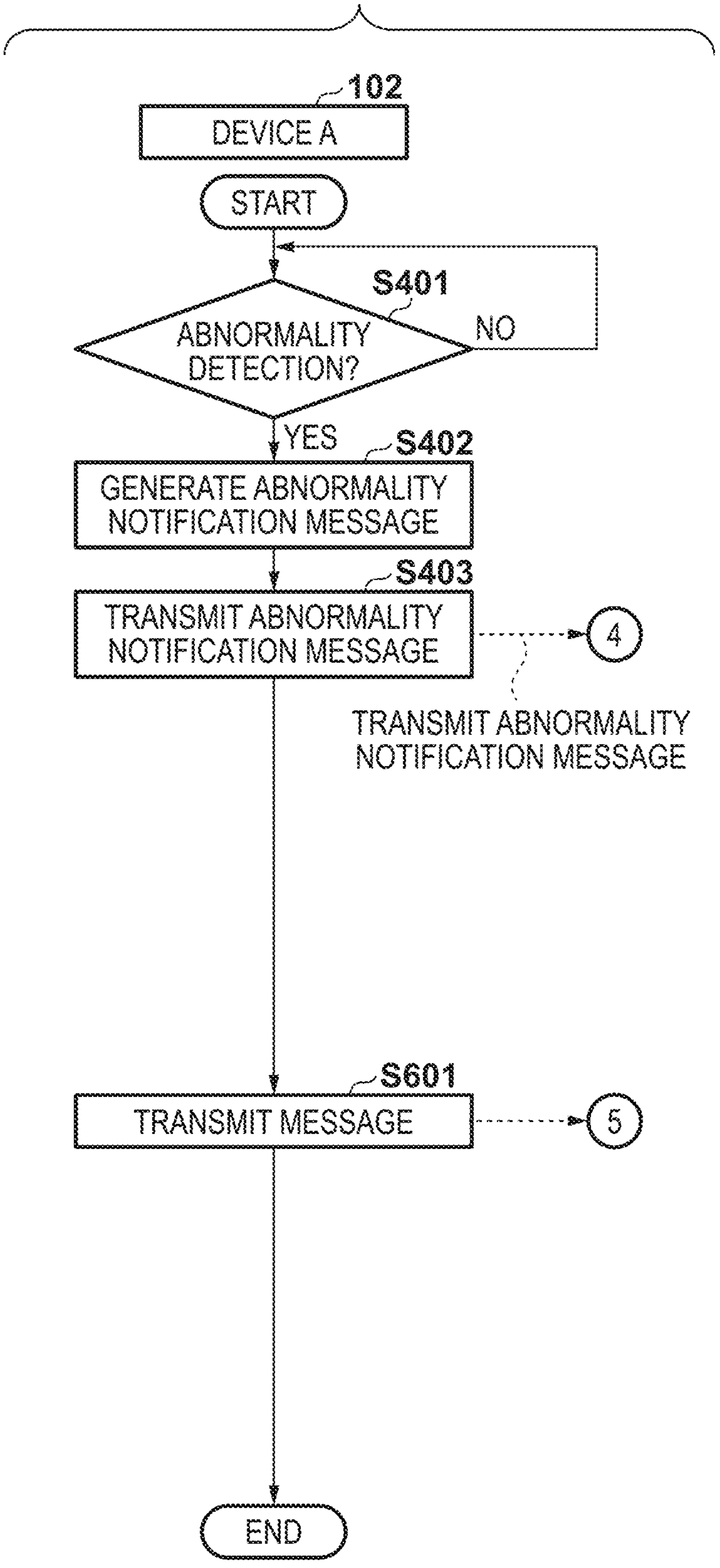
FIGS. 7A, 7B and 7C are a flowchart illustrating another operation example of the system according to the second embodiment.
Figure 7B:
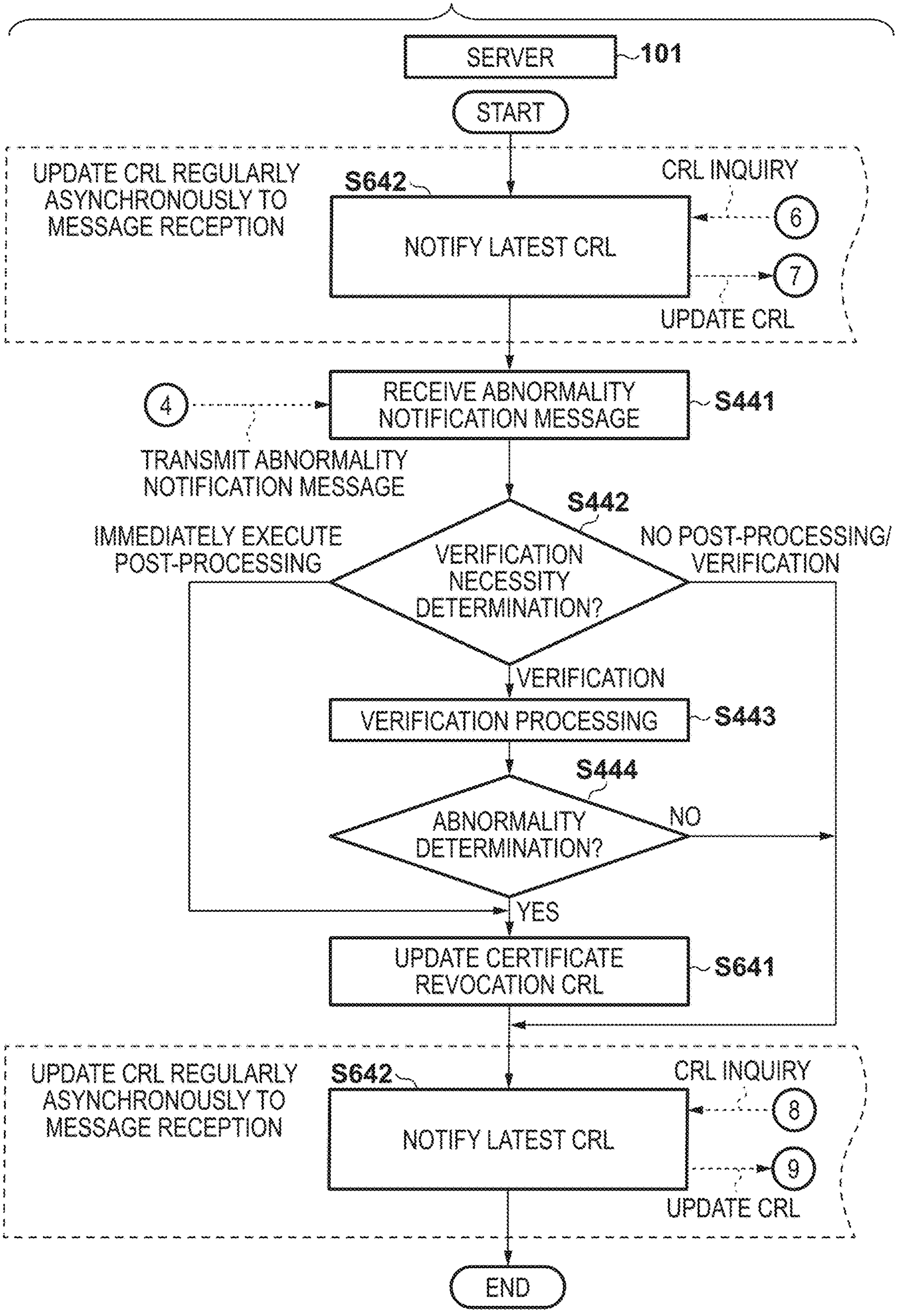
Figure 7C:
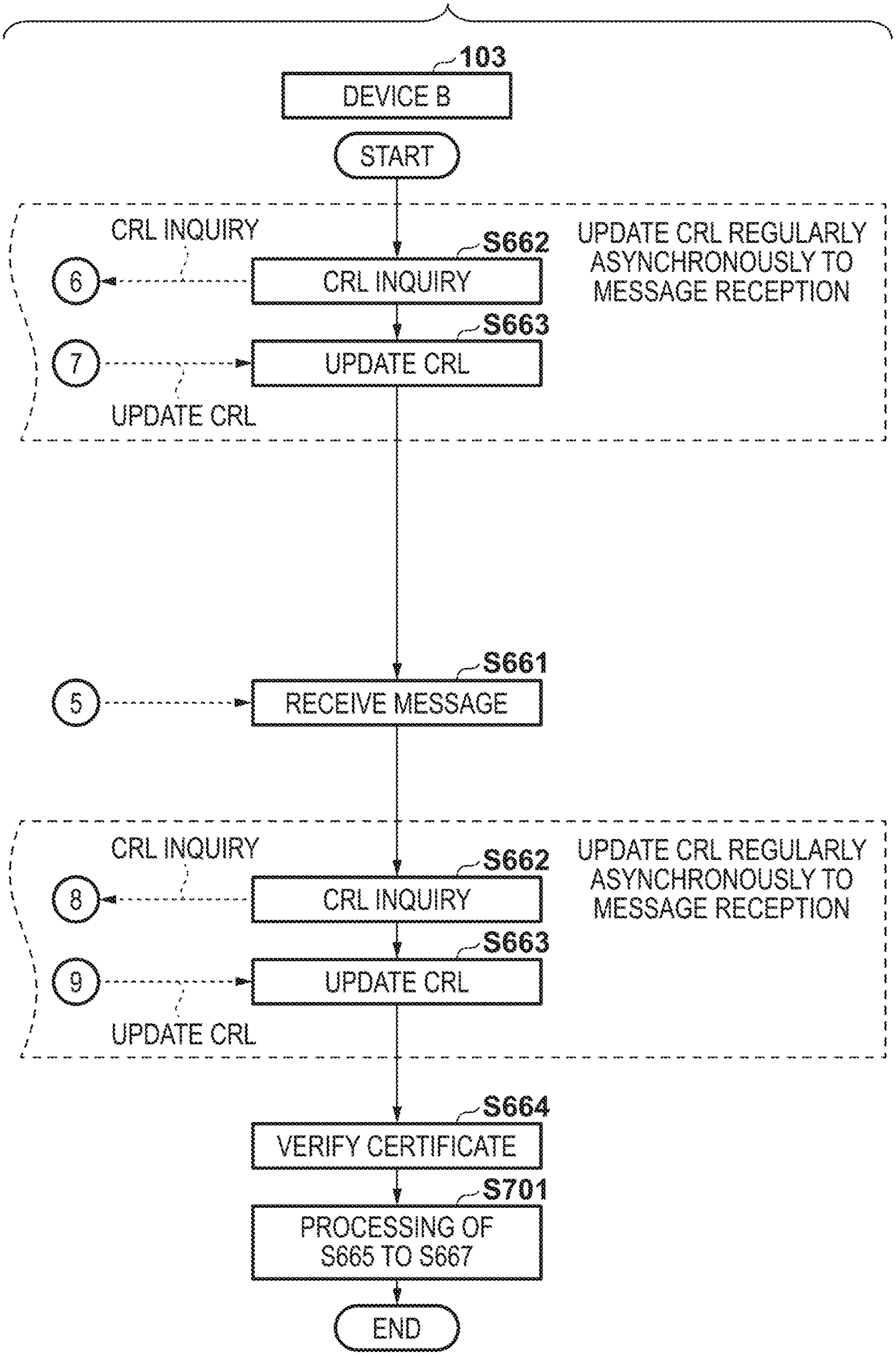

In the process according to the flowchart of FIGS. 6A and 6B, the device B103 updates the CRL managed by the own device according to the reception of a message from the device A102. However, the timing at which the device B103 updates the CRL is not limited to such a specific timing. For example, as illustrated in the flowchart of FIGS. 7A, 7B and 7C, the device B103 may update the CRL managed by the own device regularly or at any timing regardless of the reception of the message from the device A102. That is, the processes of steps S662 to S663 may be performed regularly or at an arbitrary timing. In addition, each time the server 101 updates the CRL, the updated CRL may be transmitted (notified) to each device (in this example, the device A102 and the device B103) via the network 104. In FIGS. 7A, 7B and 7C, step S701 represents the processes of steps S665 to S667 of FIGS. 6A and 6B in one step, and is the process of discarding the received message or executing the corresponding process according to whether or not the certificate of the device A is revoked.

In the second embodiment, the device B103 inquires the server 101 about the CRL, and determines whether or not the certificate of the device A102 is revoked using the CRL acquired from the server 101 in response to the inquiry. However, this mechanism is an example of a mechanism in which the server 101 can revoke the certificate of the device A102 and the device B103 can detect the revocation of the certificate, and is not limited to such a mechanism. For example, the server 101 may transmit the fact that the certificate of the device A102 is revoked to another device using another method such as an online certificate status protocol (OCSP).

In the second embodiment, a message transmitted from the device A102 or the device B103 is transmitted to the server 101 via the same network 104 regardless of whether the message is an abnormality notification message or other messages. However, the abnormality notification message transmitted from the device A102 or the device B103 may be transmitted to the server 101 via a network (e.g., a dedicated network which is a notification route for abnormality notification) different from other types of messages. For example, communication between the notification unit 203 and the notification reception unit 204 and communication between the communication units 209 of the respective devices may be performed via different networks. This can also be applied to embodiments other than the second embodiment.

In addition, the type of abnormality to be detected is not limited to an abnormality in terms of security or an abnormality in terms of safety, and may include various abnormalities. In addition, there are various abnormalities such as an abnormality occurring in the device, an abnormality acting on the device from the outside, and the like and the abnormality is not limited to a specific abnormality as long as the device can detect the abnormality.

In the second embodiment, a case has been described in which the server 101 revokes the certificate of the device A102 according to the detection of the abnormality by the device A102, and the device B103 discards the message from the device A102 according to the detection of the revocation of the certificate of the device A102. However, the second embodiment is not limited thereto. For example, it is obvious that the present invention is also applicable to a case where the certificate of the device B103 is revoked according to the detection of abnormality by the device B103, and the message from the device B103 is discarded according to the detection of the revocation of the certificate of the device B103 by the device A102. In any case, there may be a plurality of devices that function as the device A102 and the device B103.

As described above, according to the second embodiment, since it is possible to verify the abnormality notification of the device in which the abnormality has occurred and to improve the determination accuracy of the abnormal state, it is possible to suppress unnecessary revocation of the certificate. Therefore, the certificate of the device in which the abnormality occurred can be revoked at an appropriate timing. In addition, the abnormality notification message is only transmitted to the server, and it is possible to notify a necessary device (the device B103 in the present embodiment) while reducing the communication volume. In addition, it is possible to confirm whether or not the device has an abnormality from a remote place.

Third Embodiment

Figure 8:
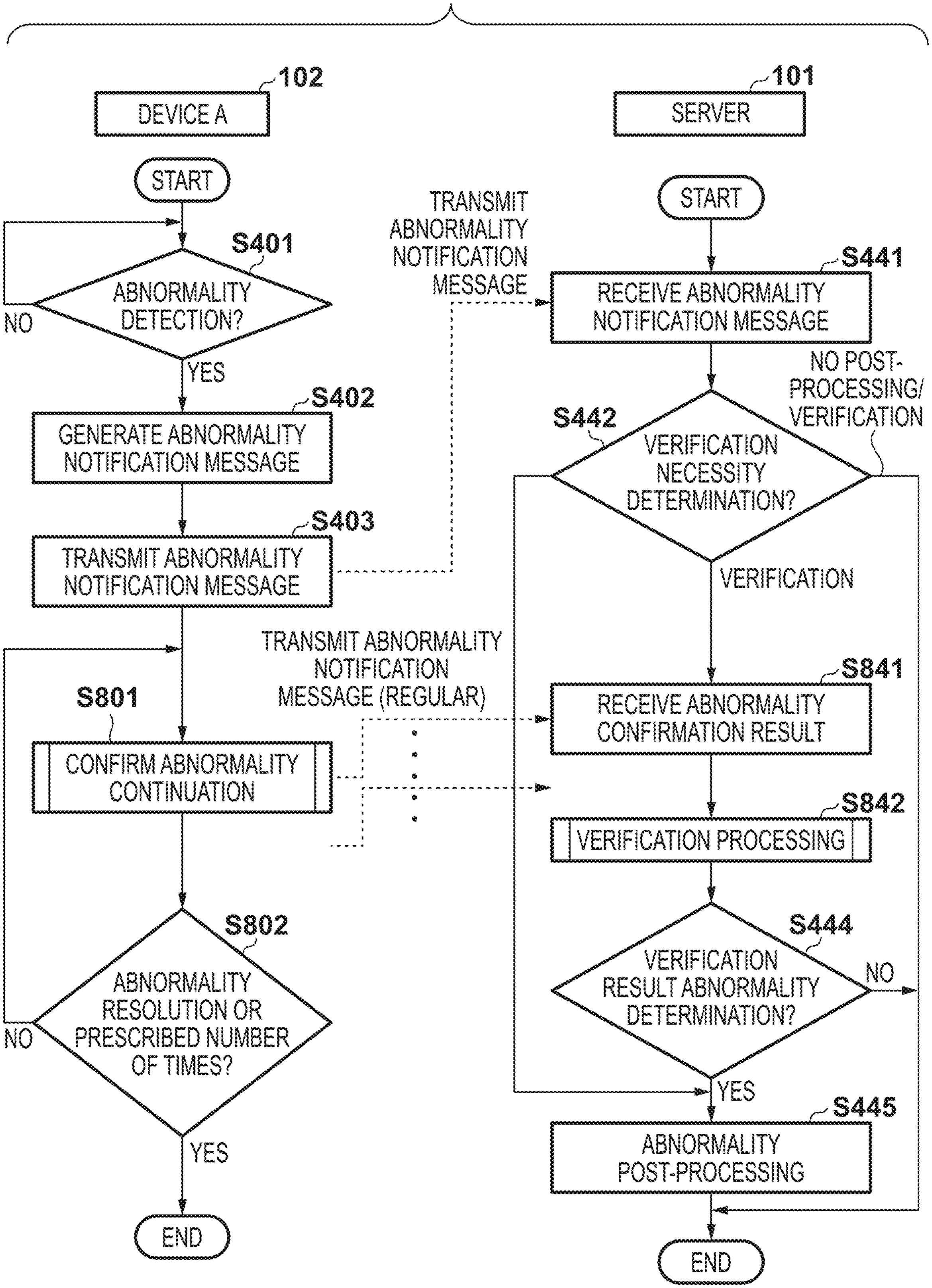
FIG. 8 is a flowchart illustrating an operation of a system according to a third embodiment.
Figure 9:
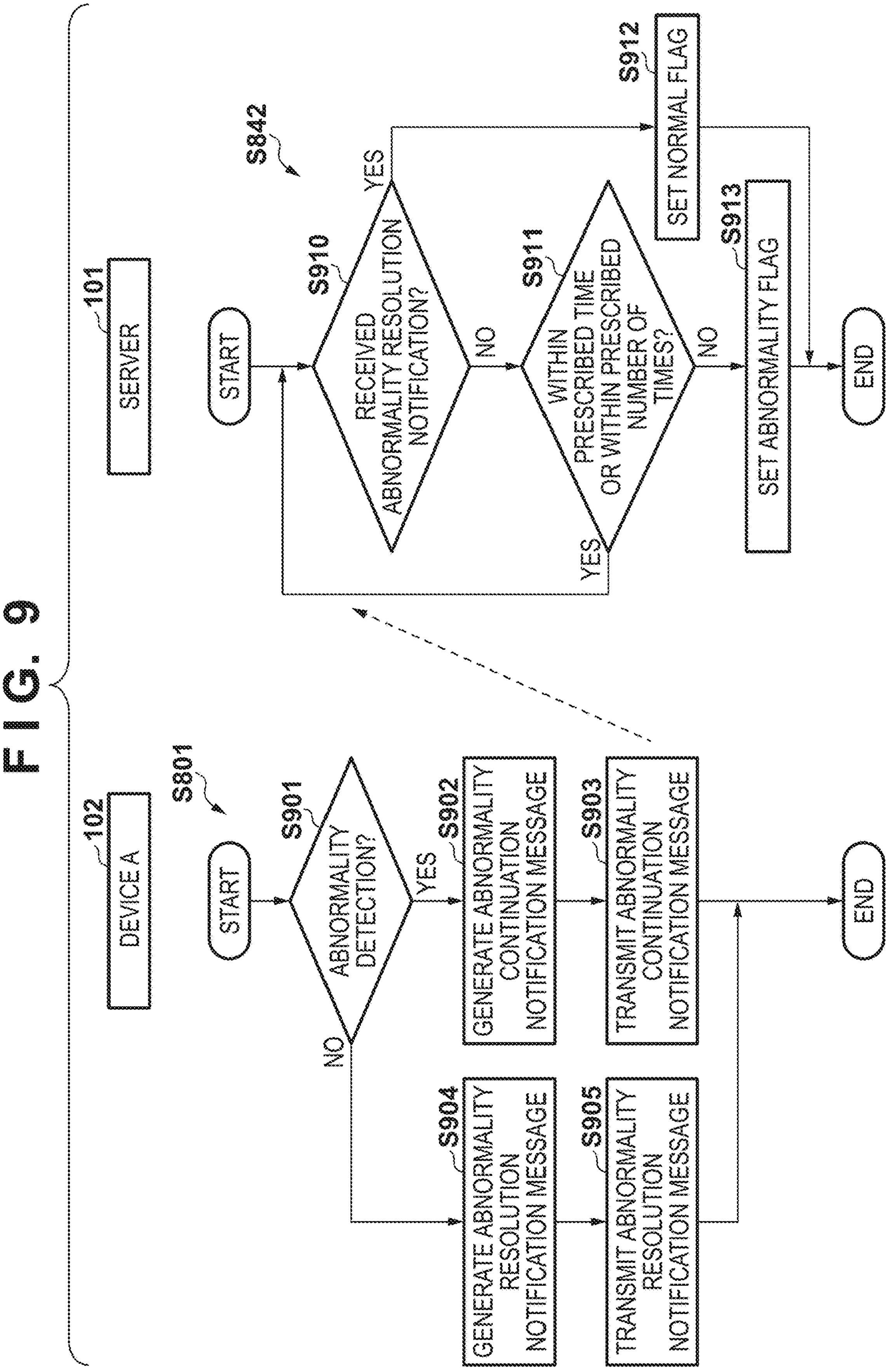
FIG. 9 is a flowchart illustrating an operation example of a verification process of the system according to the third embodiment.

The operation of the system according to the present embodiment will be described with reference to the flowchart of FIG. 8. In FIG. 8, a more specific example of the verification process in step S443 illustrated in the first embodiment (FIG. 4) is illustrated by steps S801 to S802 and steps S841 to S842. FIG. 9 is a flowchart specifically illustrating the process of step S801 (abnormal connection confirmation) and the process of step S842 (verification process) illustrated in FIG. 8. It is assumed that the device A102 and the server 101 define and share a protocol related to abnormality notification at the time of occurrence of abnormality in advance. The protocol will be described with reference to a flowchart.

The abnormality detection unit 201 of the device A102 of the third embodiment regularly confirms the continuation of the abnormality even after the abnormality notification message is transmitted to the server 101 in step S403 (hereinafter, referred to as abnormality continuation confirmation), and sequentially transmits the confirmation result to the server. That is, in step S801, the abnormality detection unit 201 of the device A102 performs continuation confirmation of the abnormality notified in step S403, and transmits the confirmation result to the server 101. Note that the notification of the confirmation result of continuation is regularly transmitted at constant intervals, but the present invention is not limited thereto. For example, the transmission interval of the confirmation result may be gradually increased as time elapses after the abnormality is first detected, or may be irregular.

Details of the abnormality continuation confirmation in step S801 will be described with reference to FIG. 9. In step S901, the abnormality detection unit 201 of the device A102 performs abnormality detection again in order to confirm whether or not the abnormality notified to the server 101 is continued. In a case where it is determined that the abnormality is continued by the abnormality detection (YES in 5901), the process proceeds to step S902. In step S902, the generation unit 202 of the device A102 generates the abnormality continuation notification message, and in step S903, the notification unit 203 of the device A102 transmits the abnormality continuation notification message to the server 101. On the other hand, in a case where it is determined that the abnormality has been resolved (NO in step S901), the process proceeds to step S904. In step S904, the generation unit 202 of the device A102 generates an abnormality resolution notification message, and in step S905, the notification unit 203 of the device A102 transmits the abnormality resolution notification message to the server 101.

In step S802, in a case where the abnormality has been resolved or in a case where the abnormality continuation confirmation has been performed a prescribed number of times (YES in step S802), the device A102 ends the abnormality continuation confirmation process (step S801). In a case where the condition is not satisfied (NO in step S802), the abnormality continuation confirmation (step S801) is repeated. In the determination of step S802, instead of the prescribed number of times or in combination with the prescribed number of times, the elapse of a prescribed time (elapse of a prescribed time from the start of the abnormality continuation confirmation) may be used as a condition.

On the other hand, in the server 101, in a case where it is determined in step S442 that the verification is necessary, in step S841, the notification reception unit 204 continues to receive the notification message (abnormality continuation notification message or abnormality resolution notification message) from the device A102. In step S842, the verification unit 215 of the server 101 verifies the abnormal state of the device A102 using a verification criterion defined in advance. The verification criterion is, for example, any one of the duration, the number of notifications, and the frequency of the abnormality notification or the abnormality continuation notification, or a combination of two or more thereof.

The verification process in step S842 will be described with reference to the flowchart in FIG. 9. In step S910, the verification unit 215 of the server 101 determines whether the abnormality notification message received in step S841 is an abnormality continuation notification message or an abnormality resolution notification message. In a case where the verification unit 215 determines as the abnormality continuation notification message (NO in step S910), the process proceeds to step S911. In step S911, the verification unit 215 determines whether the elapsed time from the start of receiving the abnormality continuation notification message is within the prescribed time, or whether the cumulative number of times, which is the number of times of reception of the abnormality continuation notification message, is within the prescribed number of times. In a case where the verification unit 215 determines that the elapsed time is within the prescribed time and the cumulative number of times is within the prescribed number of times (YES in step S911), the process returns to step S910. On the other hand, in a case where the verification unit 215 determines that the elapsed time exceeds the prescribed time or the cumulative number of times exceeds the prescribed number of times, the process proceeds to step S913. In step S913, the verification unit 215 sets an abnormality flag. Accordingly, in step S444, it is determined that an abnormality has occurred as a result of the verification process. On the other hand, in a case where the verification unit 215 determines that the abnormality resolution notification message is received (YES in step S910), the process proceeds to step S912. In step S912, the verification unit 215 sets a normal flag. Accordingly, in step S444, it is determined that no abnormality has occurred as a result of the verification process.

Note that, in the above description, as the verification criterion defined in advance, both "it is determined as abnormal in a case where the abnormality continuation notification message is repeatedly received exceeding the prescribed time" and "it is determined as abnormal in a case where the abnormality continuation notification message is repeatedly received exceeding the prescribed number of times" are used. However, the present invention is not limited thereto, and any one of a prescribed time and a prescribed number of times may be used, or other criteria may be used. For example, the above example is an example in which the verification is performed using the continuity of the occurrence of the abnormality, but the verification can also be performed using the frequency of the occurrence of the abnormality. For example, the verification unit 215 may measure the number of times of reception, that is, the frequency of the abnormality continuation notification message within the prescribed time, and determine that an abnormality has occurred in a case where the frequency exceeds a threshold value. In a case where such a frequency is used, for example, even in a case where the occurrence and resolution of the abnormality are repeated, the occurrence of the abnormality can be correctly verified. In addition, the abnormality continuation notification message may be a specific notification message indicating that the abnormality is continued, or may be a message having the same content as the abnormality notification message generated in step S402. In a case where the abnormality notification message is used as the abnormality continuation notification message, the server 101 may analyze the received abnormality notification message and determine continuation of the abnormality.

As described above, according to the third embodiment, it is possible to verify the abnormality notification of the device in which the abnormality has occurred and to improve the determination accuracy of the abnormal state. That is, the validity of the notified abnormality can be accurately determined. Although the example in which the third embodiment is applied to the first embodiment has been described above, it is obvious that the third embodiment may be applied to the second embodiment.

Fourth Embodiment

Figure 10:
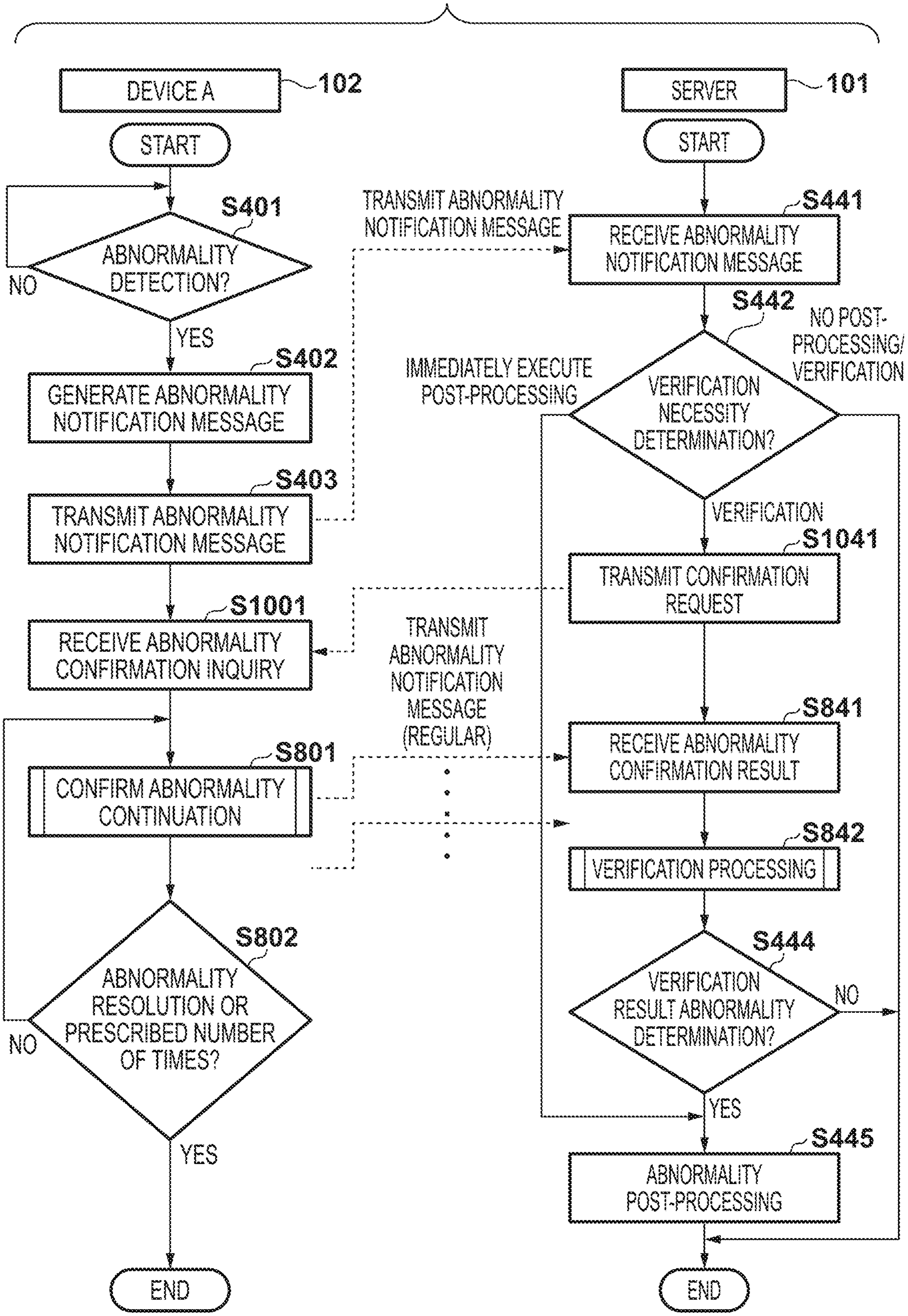
FIG. 10 is a flowchart illustrating an operation example of a system according to a fourth embodiment.

The operation of the system according to the fourth embodiment will be described with reference to the flowchart of FIG. 10. The flowchart shown in FIG. 10 shows another example of the verification process of step S443 shown in the first embodiment (FIG. 4) by steps S1001 and S1041. Note that the process illustrated in FIG. 10 is obtained by adding S1001 and S1041 to the process illustrated in the third embodiment (FIG. 8).

In step S1041, the verification unit 215 of the server 101 transmits an abnormal state re-confirmation request to the device A102 via the communication unit 209. In step S1001, when the re-confirmation request transmitted from the server 101 is received via the communication unit 209, the abnormality detection unit 201 of the device A102 executes the abnormality continuation confirmation (steps S801 to S802) described in the third embodiment with the re-confirmation request as a trigger. Note that, in FIG. 10, the re-confirmation request transmitted from the server 101 is once, but the present invention is not limited thereto. The issuance of the re-confirmation request merely needs to be defined between the server 101 and the device A102, and for example, the abnormality continuation confirmation may be performed once every time the confirmation request is transmitted. In this case, for example, the server 101 may regularly transmit the re-confirmation request at regular intervals, or may gradually increase the interval of transmitting the re-confirmation request with elapse of time from the first detection of the abnormality. In step S801, the abnormality detection unit 201 of the device A102 transmits the confirmation result of the abnormal state to the server 101. Note that not only the abnormal state but also detailed information related to the abnormality may be added to the information transmitted from the device A102.

As described above, according to the fourth embodiment, it is possible to verify the abnormality notification of the device in which the abnormality has occurred and to improve the determination accuracy of the abnormal state. Although the fourth embodiment has been described by being applied to the first embodiment, the present invention is not limited thereto. It is clear that the fourth embodiment may be applied to the second embodiment.

Fifth Embodiment

In the above embodiment, an example has been described in which the notification of abnormality is received only from the device (e.g., the device A102) of the occurrence source of the abnormality. However, the present disclosure is not limited to this, and the notification of the occurrence of the abnormality can also be received from a device (e.g., the device B103) other than the device (e.g., the device A102) of the abnormality occurrence source. In the fifth embodiment, such an information processing system will be described.

Figure 11:
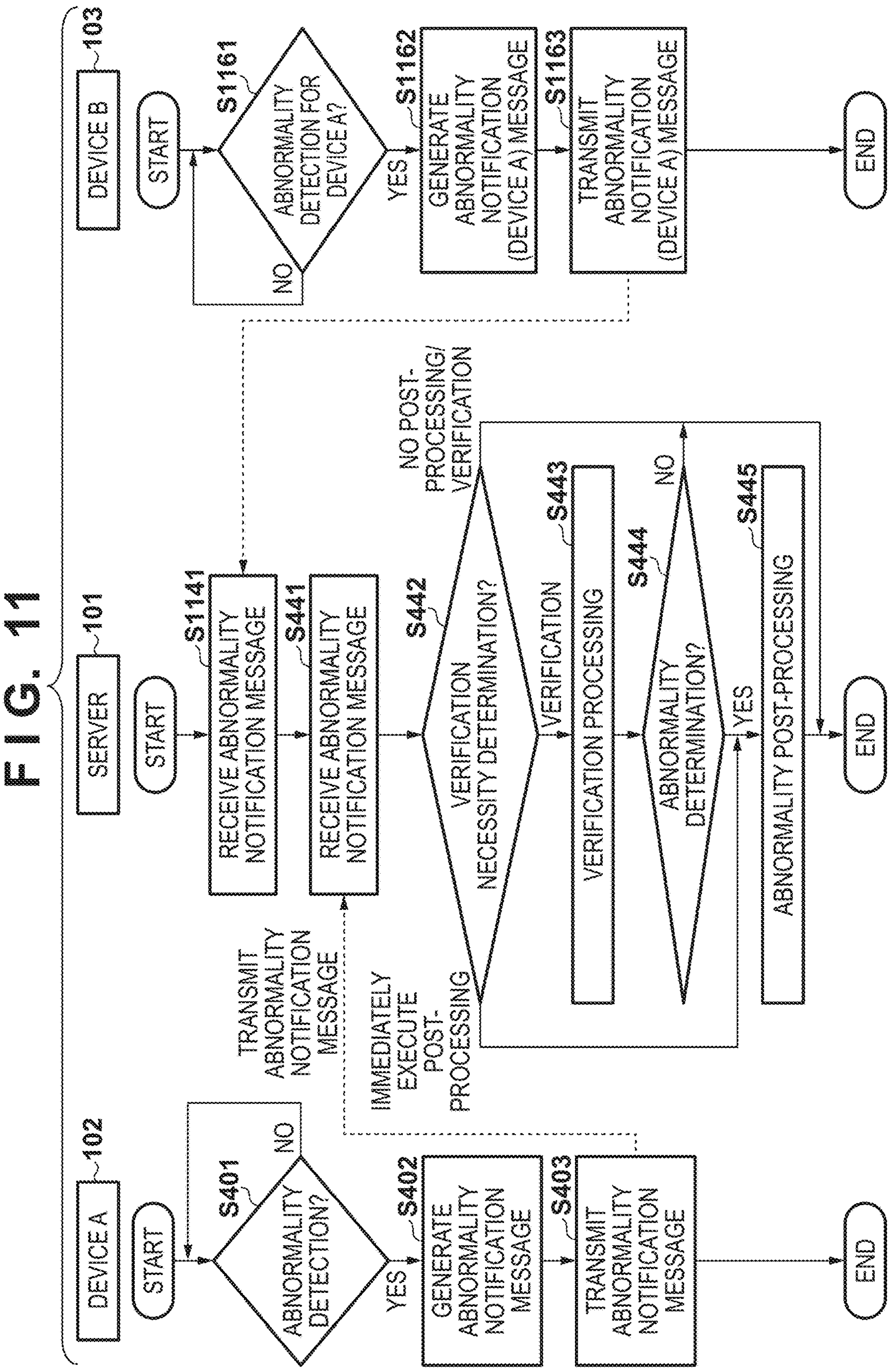
FIG. 11 is a flowchart illustrating an operation example of a system according to a fifth embodiment.

An operation example of the system according to the fifth embodiment will be described with reference to a flowchart of FIG. 11. In the flowchart shown in FIG. 11, processes similar to the processes shown in the first embodiment (FIG. 4) are denoted with the same step numbers. In the fifth embodiment, it is assumed that the device B103 exists in a range in which an abnormality of the device A102 can be detected. The range in which an abnormality can be detected may be, for example, a range existing in the periphery in terms of distance, or in a case where an abnormality can be detected by communication, the range may be spaced apart in terms of distance as long as the communication is possible. In addition, in the example of vehicle to X (V2X), the range in which an abnormality can be detected may be a surrounding vehicle or a device around a vehicle such as a roadside device. Furthermore, in the present embodiment, the device B103 is exemplified as one device, but the number of devices may be one or more and is not limited.

In step S1161, the abnormality detection unit 201 of the device B103 existing in the range in which the abnormality of the device A102 can be detected detects the abnormality of the device A102. Specific configuration for the abnormality detection unit 201 of the device B103 to detect an abnormality of the device A102 includes, for example, a configuration in which an abnormality of the device A102 is detected using a camera or the like, a configuration in which an inquiry is made to the device A102 using communication via the communication unit 209 to detect an abnormality, and the like. In addition, for example, the abnormality of the device A102 may be detected by detecting the abnormality of the message from the device A102 received via the communication unit 209, and the method of detecting the abnormality by the abnormality detection unit 201 is not limited to these examples. When the abnormality detection unit 201 detects an abnormality of the device A102 (YES in step S1161), the process proceeds to step S1162. In step S1162, the generation unit 202 of the device B103 generates an abnormality notification message related to the device A102 detected in step S1161. In step S1163, the notification unit 203 of the device B103 transmits the generated abnormality notification message to the server 101.

In step S1141, the server 101 receives the abnormality notification message from the device B103. In step S441, the notification reception unit 204 of the server 101 receives the abnormality notification message transmitted from the device A102. In step S442, the determination unit 213 determines whether or not the abnormality notification message received by the notification reception unit 204 needs to be verified by the verification function. In a case where it is determined in step S442 that "verification" is necessary, the process proceeds to step S443. In step S443, the verification unit 215 of the server 101 uses the abnormality notification message received from the device B103 in step S1141 for verification of the abnormality notified from the device A102. For example, the verification unit 215 compares the abnormality notification message received from the device A102 with the abnormality notification message related to the device A102 received from the device B103, and sets the abnormality flag when the abnormality contents match. Alternatively, the verification unit 215 sets the abnormality flag when receiving the abnormality notification message related to the device A102, for example, from the plurality of devices B103 or the predetermined number or more devices B103. Here, in FIG. 11, although step S1141 is illustrated as a process prior to step S441, step 1141 merely needs to be executed prior to step S443, and the processing order is not limited to the illustrated order. In addition, the server 101 saves the abnormality notification received in step S1141 in a database or the like so that the abnormality notification can be used for verification in step S443.

As described above, according to the fifth embodiment, it is possible to verify the abnormality notification of the device in which the abnormality has occurred from the viewpoint of the third party and to improve the determination accuracy of the abnormal state. Even if the abnormality detection unit 201, the generation unit 202, and the notification unit 203 of the device A102 fail and the abnormality notification is sent even though the device A102 is normal, the server 101 can correctly determine the state of the device A102. Although the fifth embodiment has been described by being applied to the first embodiment, the present invention is not limited thereto. For example, it is obvious that the fifth embodiment can be applied to the second embodiment.

Sixth Embodiment

Figure 12A:
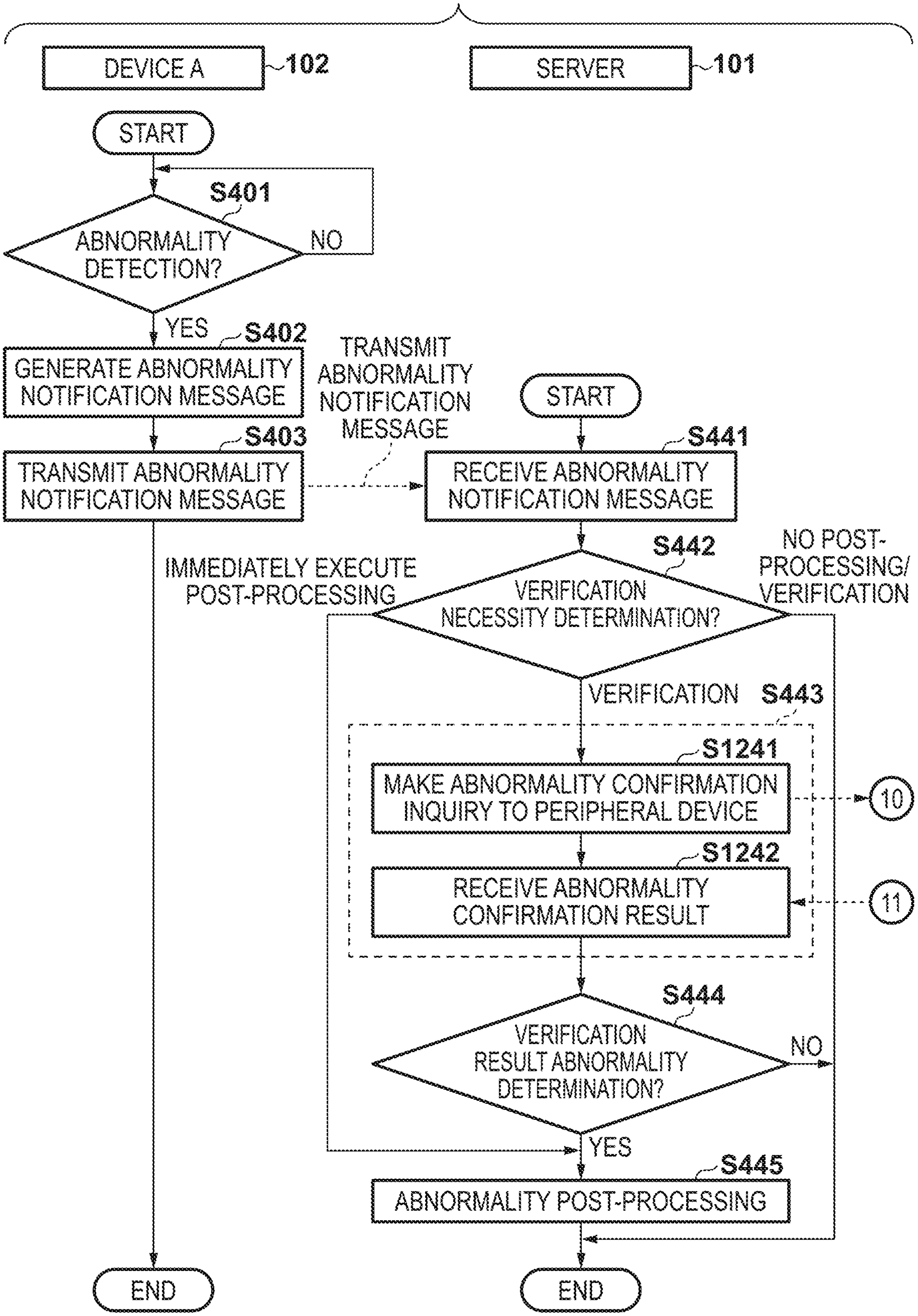
FIGS. 12A and 12B are a flowchart illustrating an operation example of a system according to a sixth embodiment.
Figure 12B:
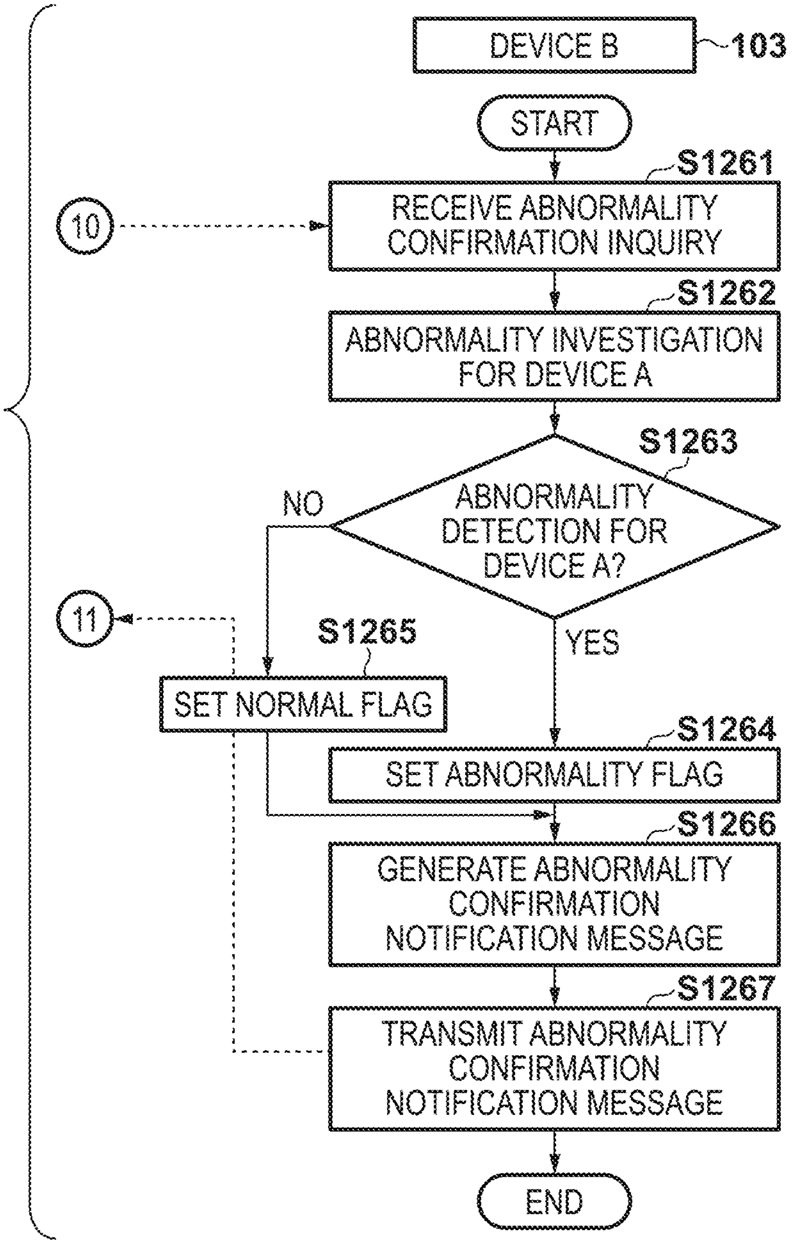

An operation of the system according to the sixth embodiment will be described with reference to a flowchart of FIGS. 12A and 12B. In the flowchart shown in FIGS. 12A and 12B, processes similar to the processes shown in the first embodiment (FIG. 4) are denoted with the same step numbers. Similarly to the fifth embodiment, it is assumed that the device B103 exists in a range in which an abnormality of the device A102 can be detected, and the number of devices B103 may be at least one. In the fifth embodiment, the device B103 existing in the range in which the abnormality of the device A102 can be detected detects the abnormality of the device A, and notifies the server 101 of the abnormality. In the sixth embodiment, the server 101 requests the device B103 existing in a range in which the abnormality of the device A102 can be detected to detect the abnormality of the device A102. The device B103 that has received the request detects the abnormality of the device A and notifies the server 101 of the abnormality.

In step S1241, in order to confirm the validity of the abnormality notification from the device A102, the verification unit 215 of the server 101 transmits an abnormality confirmation inquiry to a device (also referred to as a peripheral device) in a range in which an abnormality of the device A102 can be detected. Here, the server 101 specifies the device B103 as one of the peripheral devices, and the verification unit 215 transmits an abnormality confirmation inquiry to the device B103. Note that, in the present example, a configuration for making an inquiry to a device specified as a peripheral device is used, but the present invention is not limited thereto. For example, an abnormality confirmation inquiry of the device A102 may be broadcasted, and a confirmation result may be received from a device that can confirm an abnormality of the device A102. In step S1261, the device B103, which is a peripheral device of the device A102, receives an abnormality confirmation inquiry from the server 101 via the communication unit 209. In step S1262, the device B103 uses the abnormality detection unit 201 to investigate the abnormality content of the device A102 designated by the server 101. For example, if it is necessary to check the appearance, if the device B103 is a vehicle, the state of the device A102 is checked using an in-vehicle camera. For example, when the device B103 is a roadside device (a communication device, a sensor, a display device, or the like installed on the side of a road (roadside)), the state of the device A102 is checked using a camera of the roadside device. In addition, the device B103 may communicate with the device A102 using the communication unit 209 to confirm the abnormality. As described above, the device B103 performs the investigation according to the confirmation content of the abnormality, but the confirmation method is not limited. Whether or not the device B103 is a peripheral device of the device A102 can be specified based on, for example, the relationship between the current position of the device A102 and the position of the device B103.

In step S1263, the abnormality detection unit 201 of the device B103 determines whether or not an abnormality of the device A102 is detected as a result of the abnormality investigation as described above. In a case where it is determined that an abnormality has been detected (YES in step S1263), the abnormality detection unit 201 of the device B103 sets an abnormality flag in step S1264. In a case where it is determined that no abnormality has been detected (NO in step S1263), the abnormality detection unit 201 of the device B103 sets a normal flag in step S1265. In step S1266, the generation unit 202 of the device B103 generates the abnormality confirmation notification message according to which of the abnormality flag and the normality flag is set. In step S1267, the device B103 transmits an abnormality confirmation notification message to the server 101 via the notification unit 203. In step S1242, the server 101 receives the abnormality confirmation notification message indicating the abnormality confirmation result from the device B103, and the verification unit 215 uses the abnormality confirmation notification message for the verification process to determine the validity of the abnormality notification of the device A102.

Note that, as a verification method, for example, in a case where the confirmation result from the device B103 indicates an abnormality, determination is made that the abnormality notified to the device A102 has occurred. In addition, the verification method described in the fifth embodiment may be used. For example, the verification unit 215 determines that an abnormality has occurred in the device A102 when receiving an abnormality confirmation notification message indicating that an abnormality has occurred in the device A102 from a plurality of the devices B103 or from a predetermined number or more devices B103. Alternatively, the verification unit 215 compares the abnormality notification message received from the device A102 with the abnormality confirmation notification message regarding the device A102 received from the device B103, and determines that an abnormality has occurred in the device A102 when the abnormality content matches. However, in this case, the device B103 needs to determine the abnormality content of the device A102 and include the determined abnormality content in the abnormality confirmation notification message.

Seventh Embodiment

Figure 13:
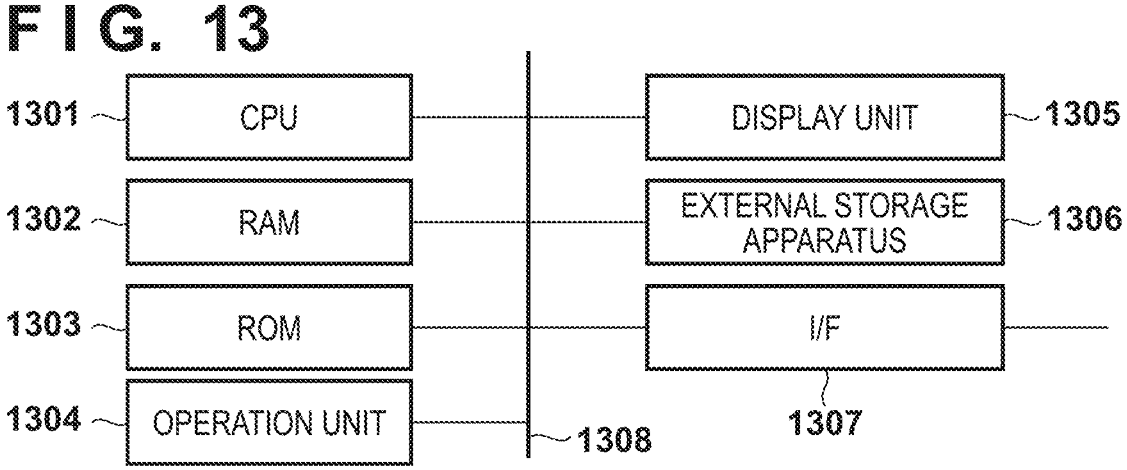
FIG. 13 is a block diagram illustrating a hardware configuration example of a device according to a seventh embodiment.

The functional units illustrated in FIGS. 2 and 5 may be implemented by hardware, or may be implemented by software (computer program). In the latter case, the computer device (information processing device) that can execute the computer program is applicable to the server 101, the device A102, and the device B103. A hardware configuration example of a computer device applicable to the server 101, the device A102, and the device B103 will be described with reference to a block diagram of FIG. 13.

A CPU 1301 executes various processes using computer programs and data stored in a RAM 1302 or a ROM 1303. As a result, the CPU 1301 controls the operation of the entire computer device, and executes or controls each process described above as processes performed by the server 101, the device A102, and the device B103 to which the computer device is applied.

The RAM 1302 includes an area for storing computer programs and data loaded from the ROM 1303 or an external storage apparatus 1306, or an area for storing data received from the outside via an I/F 1307. The RAM 1302 further includes a work area used when the CPU 1301 executes various processes. The RAM 1302 may thus provide various areas as appropriate. The ROM 1303 has stored therein setting data of the computer apparatus, computer programs and data related to activation of the computer apparatus, computer programs and data related to basic operations of the computer apparatus, or the like.

An operation unit 1304, which is a user interface such as a keyboard, a mouse or a touch panel, can be operated by the user to input various instructions to the CPU 1301. For example, the user can operate the various applications 290 using the operation unit 1304. A display unit 1305 is a display device including a liquid crystal screen or a touch panel screen, and can display the results of processes by the CPU 1301 using, for example, images and characters. Here, the display unit 1305 may be a projection apparatus such as a projector that projects images or characters.

An external storage apparatus 1306 is a large-capacity information storage apparatus such as a hard disk drive apparatus. The external storage apparatus 1306 stores computer programs, data, and the like for causing the CPU 1301 to execute or control the various processes described above as being performed by the OS, the server 101, the device A102, and the device B103. The data saved in the external storage apparatus 1306 also includes the data (certificates, serial numbers, CRLs, etc.) described as being managed by each device of the server 101, the device A102, and the device B103. The computer programs and data stored in the external storage apparatus 1306 are loaded to the RAM 1302 as appropriate according to the control by the CPU 1301, which are then subjected to processing by the CPU 1301.

The I/F 1307 is a communication interface for performing data communication with an external device via the network 104. Note that the I/F 1307 may have an I/F for connecting to each network in a case where a plurality of networks are prepared according to the communication use.

The CPU 1301, the RAM 1302, the ROM 1303, the operation unit 1304, the display unit 1305, the external storage apparatus 1306, and the I/F 1307 are all connected to a system bus 1308. Note that a computer device having the hardware configuration example of FIG. 13 may be applied to each of the server 101, the device A102, and the device B103, or a computer device having a different hardware configuration may be applied to each of the server 101, the device A102, and the device B103.

Alternatively, the numerical values, processing timings, processing orders, processing entities, and data (information) configuration/acquiring method/transmission destination/transmission source/storage location, and the like are referred to by way of an example for specific description, and are not intended to be limited to these examples. Alternatively, some or all of the embodiments described above may be used in combination as appropriate. Alternatively, some or all of the embodiments described above may be selectively used.

According to the present invention, it is possible to verify the validity of an abnormality notification notified from an external device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-101186, filed Jun. 20, 2023, which is hereby incorporated by reference herein in its entirety.

What is claimed is:

1. An information processing system comprising a first device and a second device that are communicably connected to each other, wherein the first device comprises:

at least one processor; and a memory storing a program which, when executed by the at least one processor, causes the first device to:

detect an abnormality occurring in the first device; and transmit, to the second device, an abnormality notification including information indicating at least a type and a level of the detected abnormality when the abnormality is detected; and wherein the second device comprises:

at least one processor; and a memory storing a program which, when executed by the at least one processor, causes the second device to:

receive the abnormality notification transmitted from the first device;

determine, based on the type and the level included in the abnormality notification, whether verification of the abnormality notification is required;

when it is determined that verification is required, acquire additional information related to the abnormality from at least one of the first device and another device of the information processing system; and verify validity of the abnormality notification based on the acquired additional information, wherein the program stored in the memory of the second device further causes the second device to:

receive, from the first device, at least one of an abnormality continuation notification indicating continuation of the abnormality and an abnormality resolution notification indicating resolution of the abnormality; and verify validity of the abnormality notification based on at least one of a duration, a number of times, and a frequency at which the abnormality continuation notification is received, and cancelling the verification upon reception of the abnormality resolution notification, wherein the information processing system further comprises at least one third device that is a peripheral device of the first device, wherein the program stored in the memory of the second device further causes the second device to:

transmit an abnormality confirmation inquiry to the third device when verification is determined to be required; and verify validity of the abnormality notification based on a confirmation result indicating whether or not an abnormality of the first device is detected, the confirmation result being transmitted from the third device to the second device in response to the abnormality confirmation inquiry.

2. The information processing system according to claim 1, wherein the program stored in the memory of the first device further causes the first device to transmit. after transmitting the abnormality notification, information indicating a result of detection of the abnormality to the second device, and wherein the program stored in the memory of the second device further causes the second device to use the information indicating the result as part of the additional information for verifying validity of the abnormality notification.

3. The information processing system according to claim 2, wherein, when it is determined that verification of the abnormality notification is required, the program stored in the memory of the second device further causes the second device to transmit a request for confirmation of the abnormality to the first device, and wherein the program stored in the memory of the first device causes the first device to transmit a confirmation result in response to the request.

4. The information processing system according to claim 2, wherein the information indicating the result of detection of the abnormality is transmitted at predefined time intervals.

5. The information processing system according to claim 2, wherein an interval for transmitting the information indicating the result is gradually extended with lapse of time after detection of the abnormality.

6. The information processing system according to claim 2, wherein the program stored in the memory of the second device further causes the second device to verify validity of the abnormality notification based on whether at least one of a cumulative number of times, an elapsed duration, and a reception frequency of the information indicating the result exceeds a prescribed condition, and to cancel the verification upon reception of information indicating resolution of the abnormality.

7. The information processing system according to claim 1, wherein the additional information includes information transmitted from at least one third device that detects an abnormality of the first device.

8. The information processing system according to claim 7, wherein, when verification of the abnormality notification is determined to be required, the program stored in the memory of the second device further causes the second device to transmit a confirmation inquiry to the third device, and to receive a confirmation result transmitted in response to the confirmation inquiry.

9. The information processing system according to claim 8, wherein the program stored in the memory of the second device further causes the second device to verify validity of the abnormality notification based on correspondence between abnormality content included in the abnormality notification and abnormality content included in the confirmation result.

10. The information processing system according to claim 1, wherein the program stored in the memory of the second device further causes the second device to execute post-processing corresponding to the abnormality based on a result of the verification.

11. The information processing system according to claim 10, wherein the post-processing includes revocation of a certificate used by the first device in the information processing system.

12. The information processing system according to claim 11, wherein the program stored in the memory of the second device further causes the second device to transmit management information including a revocation state of the certificate to another device in response to a request.

13. The information processing system according to claim 1, wherein the program stored in the memory of the second device further causes the second device to determine content of the abnormality based on information included in the abnormality notification, and to determine whether or not to execute verification based on the determined content.

14. The information processing system according to claim 13, wherein the program stored in the memory of the second device further causes the second device to execute verification when the abnormality is determined to be a first type, and to execute post-processing without executing verification when the abnormality is determined to be a second type different from the first type.

15. An information processing device comprising:

at least one processor; and a memory storing a program which, when executed by the at least one processor, causes the information processing device to:

receive an abnormality notification transmitted from a first device, the abnormality notification including information indicating at least a type and a level of a detected abnormality;

determine, based on the type and the level included in the abnormality notification, whether verification of the abnormality notification is required;

when it is determined that verification is required, acquire additional information related to the abnormality from at least one of the first device and another device of an information processing system; and verify validity of the abnormality notification based on the acquired additional information, wherein the program further causes the information processing device to:

receive, from the first device, at least one of an abnormality continuation notification indicating continuation of the abnormality and an abnormality resolution notification indicating resolution of the abnormality; and verify validity of the abnormality notification based on at least one of a duration, a number of times, and a frequency at which the abnormality continuation notification is received, and cancelling the verification upon reception of the abnormality resolution notification.

16. An information processing method comprising:

receiving an abnormality notification transmitted from a first device, the abnormality notification including information indicating at least a type and a level of a detected abnormality;

determining, based on the type and the level included in the abnormality notification, whether verification of the abnormality notification is required;

when it is determined that verification is required, acquiring additional information related to the abnormality from at least one of the first device and another device of an information processing system; and verifying validity of the abnormality notification based on the acquired additional information, wherein the method further comprises:

receiving, from the first device, at least one of an abnormality continuation notification indicating continuation of the abnormality and an abnormality resolution notification indicating resolution of the abnormality; and verifying validity of the abnormality notification based on at least one of a duration, a number of times, and a frequency at which the abnormality continuation notification is received, and cancelling the verification upon reception of the abnormality resolution notification.

17. A non-transitory computer-readable storage medium stored with a computer program for causing a computer to execute an information processing method including:

receiving an abnormality notification transmitted from a first device, the abnormality notification including information indicating at least a type and a level of a detected abnormality;

determining, based on the type and the level included in the abnormality notification, whether verification of the abnormality notification is required;

when it is determined that verification is required, acquiring additional information related to the abnormality from at least one of the first device and another device of an information processing system; and verifying validity of the abnormality notification based on the acquired additional information, wherein the method further comprises:

receiving, from the first device, at least one of an abnormality continuation notification indicating continuation of the abnormality and an abnormality resolution notification indicating resolution of the abnormality; and verifying validity of the abnormality notification based on at least one of a duration, a number of times, and a frequency at which the abnormality continuation notification is received, and cancelling the verification upon reception of the abnormality resolution notification.

* * * * *